(12) United States Patent
Hayashi et al.

(10) Patent No.: US 7,424,072 B2
(45) Date of Patent: Sep. 9, 2008

(54) RECEIVING APPARATUS AND RECEIVING METHOD

(75) Inventors: Takaya Hayashi, Nagaokakyo (JP);
Kenichiro Hayashi, Kyotanabe (JP);
Tetsuya Yagi, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 740 days.

(21) Appl. No.: 10/476,584

(22) PCT Filed: Apr. 15, 2003

(86) PCT No.: PCT/JP03/04739

§ 371 (c)(1),
(2), (4) Date: Oct. 31, 2003

(87) PCT Pub. No.: WO03/088538

PCT Pub. Date: Oct. 23, 2003

(65) Prior Publication Data

US 2004/0208138 A1 Oct. 21, 2004

(30) Foreign Application Priority Data

Apr. 15, 2002 (JP) ............................. 2002-112711

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04B 15/00 | (2006.01) |

(52) U.S. Cl. ...................... 375/346; 714/746

(58) Field of Classification Search ................ 375/231, 375/226, 355, 224, 285, 346; 370/206; 455/139; 714/746, 799

See application file for complete search history.

(56) References Cited

U.S. PATENT DOCUMENTS 5,621,764 A 4/1997 Ushirokawa et al.

(Continued)

FOREIGN PATENT DOCUMENTS

EP 0 963 086 12/1999

(Continued)

OTHER PUBLICATIONS

Supplementary European Search Report issued Jun. 12, 2008 in Application No. EP 03 72 3113.

(Continued)

*Primary Examiner*—Jean B Corrielus
(74) *Attorney, Agent, or Firm*—Wenderoth, Lind & Ponack, L.L.P.

(57) ABSTRACT

An average power indicating channel characteristics is outputted from a reference value calculation unit as a reference value. An interference level corresponding to the degree of influence by frequency selective interference is outputted from an interference detection unit. A reliability determination unit determines a carrier that has been subjected to interference on the basis of the reference value and the interference level, to decide a reliability level. An error correction unit performs error correction of a demodulation signal on the basis of the reliability level.

27 Claims, 21 Drawing Sheets

U.S. PATENT DOCUMENTS

| | | | |
|---|---|---|---|
| 5,907,583 A | 5/1999 | Sakoda et al. | |
| 2001/0040882 A1* | 11/2001 | Ichiyoshi | 370/342 |
| 2002/0004920 A1* | 1/2002 | Cho et al. | 714/704 |
| 2004/0229581 A1* | 11/2004 | Mizoguchi et al. | 455/136 |

FOREIGN PATENT DOCUMENTS

| | | |
|---|---|---|
| EP | 1 035 692 | 9/2000 |
| EP | 1 054 541 | 11/2000 |
| EP | 1 176 750 | 1/2002 |
| EP | 1 195 960 | 4/2002 |
| JP | 2954570 | 7/1999 |
| JP | 11-252040 | 9/1999 |
| JP | 11-346205 | 12/1999 |
| JP | 2000-13353 | 1/2000 |
| JP | 2001-44965 | 2/2001 |
| JP | 2002-94484 | 3/2002 |

OTHER PUBLICATIONS

Weon-cheol Lee et al., "Viterbi Decoding Method Using Channel State Information in COFDM System", IEEE Transactions on Consumer Electronics, vol. 45, NO. 3, Aug. 1999, pp. 533-537.

* cited by examiner

● C1
◐ C2
○ C0

RECEIVING APPARATUS AND RECEIVING METHOD

TECHNICAL FIELD

The present invention relates to an apparatus and a method for receiving a signal that has been subjected to frequency division multiplexing with plural carriers, as in an orthogonal frequency division multiplex (herein after, referred to as OFDM) transmission method and, more particularly, to multi carrier receiving apparatus and method which are improved to handle cases where various types of interference including frequency selectivity interference (spurious interference, co-channel interference, and the like) is included in a received signal and deteriorate demodulation performance.

BACKGROUND ART

In recent years, with development of digital transmission technology, digital broadcasting using satellites, cables, or terrestrial waves has been widely put into actual use. Particularly, the OFDM transmission system has already been put into practical use as digital terrestrial television broadcasting scheme in Europe, and it has also been decided in Japan that the OFDM method as digital terrestrial television broadcasting scheme and digital terrestrial audio broadcasting scheme would be adopted.

The OFDM transmission method assigns data to plural different carriers that are orthogonal to each other within a transmission band to perform modulation or demodulation. In this method, Inverse Fast Fourier Transform (herein after, referred to as IFFT) processing is performed on a transmitting end, and Fast Fourier Transform (herein after, referred to as FFT) processing is performed on a receiving end. Each carrier can employ an arbitrary modulation scheme, for example, synchronous modulation such as QPSK (Quaternary Phase Shift Keying) and QAM (Quadrature Amplitude Modulation), or differential modulation such as DQPSK (Differential Quaternary Phase Shift Keying).

In the synchronous modulation scheme, a pilot signal whose amplitude and phase are known on the receiving end is periodically inserted into a transmission signal and, on the receiving end, the channel characteristic is obtained with reference to the pilot signal, thereby performing demodulation. In the differential modulation scheme, demodulation is performed by delay detection. Further, in digital transmission methods such as the OFMD transmission method, error correction code decoding processing is carried out to improve the transmission characteristics.

However, when a transmission line includes frequency selectivity interference, whose major examples are multipath interference that lowers the levels of specific carriers due to reflected waves, spurious interference that is produced for example in a case where a receiver mounted on a mobile unit is moving, and co-channel interference resulting from analog broadcasting that coexists with digital broadcasting, demodulation performance or error correction ability is greatly deteriorated.

An OFDM receiver that can void such situation has been already developed and disclosed in Japanese Published Patent Application No. Hei. 11-252040 (pages 4-5, FIG. 1) which will be described later. This prior art is briefly described with reference to drawings.

Initially, a construction of the prior art OFDM receiver is shown in FIG. 24. In this OFDM receiver, an OFDM transmission signal is inputted to a tuner unit 103 through a receiving antenna 101 and an RF amplifier 102, and station selection processing is carried out in the tuner unit. The station selection processing performed in the tuner unit 103 is implemented by tuning an oscillation frequency of a local oscillator 111 for a desired channel frequency in accordance with a frequency control signal that is inputted to a station selection information input terminal 110.

The output signal from the tuner unit 103 is converted into a digital signal by an analog-to-digital (herein after, referred to as A/D) conversion unit 104, and then subjected to orthogonal detection by an orthogonal detection unit 105, thereby obtaining a baseband OFDM signal. This baseband OFDM signal is supplied to a FFT unit 106. The FFT unit 106 transforms the inputted OFDM signal of time domain into a frequency domain signal. Here, an A/D conversion clock, and clocks or timing signals that are employed in other digital circuits are clocks or signals which are reproduced from the baseband OFDM signal by a synchronous reproduction unit 112.

The output signal from the FFT unit 106 indicates the phase and amplitude of the OFDM signal at each carrier, and this is inputted to a demodulation unit 107. The demodulation unit 107 demodulates the inputted OFDM signal by synchronous detection corresponding to the modulation scheme. By the synchronous detection, the channel characteristic of each carrier is detected using the pilot signal that is inserted at a rate of ⅓ in the frequency direction and ¼ in the time direction, and amplitude equalization and phase equalization are performed in accordance with the detected channel characteristics.

In the synchronous detection, pilot signals are arranged in 4 symbol periods in the received OFDM signal, and the channel characteristics of 3-carrier intervals are obtained from the pilot signal of 4-symbol period. Then, the channel characteristics of all carriers are obtained by interpolating these characteristics in the frequency direction. The demodulated signal is inputted to the error correction unit 108, errors that have occurred during the transmission are corrected, and the corrected signal is outputted from an output terminal 109.

The output signal of the FFT unit 106 is also inputted to the interference detection unit 113. The interference detection unit 113 judges the state of the received pilot signal to judge carriers which are subjected to frequency selectivity interference, and the judged result is inputted to the demodulation unit 107, the error correction unit 108, and the synchronous reproduction unit 112, whereby the demodulation performance is improved.

That is, because the demodulation unit 107 detects the channel characteristic for each carrier at the time of synchronous detection using the pilot signals, thereby performing the amplitude equalization and phase equalization thereof, when it is judged from the interference carrier information that the frequency that is subjected to the interference is equal to the frequency of the pilot signal, the demodulation unit does not use this signal, but detects a channel characteristic using another signal that has been interpolated with a pilot signal that is not subjected to the interference to perform demodulation. Further, the error correction unit 108 performs weighting processing such as loss correction with information of carriers that are subjected to interference. The synchronous reproduction unit 112 performs synchronous reproduction with a small error in accordance with a signal that is not subjected to interference.

FIG. 25 is a block diagram illustrating a specific construction of the interference detection unit 113 in the multi-carrier receiver of FIG. 24. A signal that has been subjected to fast Fourier transform is inputted from the FFT unit 106 to a pilot extraction unit 113a in the interference detection unit 113. The pilot extraction unit 113a extracts the pilot signal from the inputted signal. The output of the pilot extraction unit is inputted to an integrator 113b and a subtractor 113c.

The integrator 113b integrates the amplitudes of respective pilot signals to obtain an average value, and outputs the average amplitude to the subtractor 113c. The subtractor 113c obtains a difference between the average amplitude of the pilot signals and the amplitude of each pilot signal. The obtained difference is inputted to an absolute value operation unit 113d as an error for each pilot signal. The absolute value operation unit 113d calculates the absolute value of the error for each pilot signal.

The output of the absolute value operation unit 113d is supplied to an integrator 113e, and integration processing for the error of each pilot signal in the time direction is executed. The result of this processing is supplied to a comparator 113f and an averaging unit 113g as an error signal for each pilot signal. Here, the error signal for each pilot signal corresponds to a C/N ratio for each pilot signal. The C/N ratio for each pilot signal is outputted from the averaging unit 113g as a C/N ratio for all pilot signals. On the other hand, the comparator 113f performs a comparison between the C/N ratio of each pilot signal and the C/N ratio of all pilot signals, and when a difference in the C/N ratio is large on the basis of the comparison result, it determines that there exists frequency selectivity interference. The output from the comparator 113f is inputted to the demodulation unit 107, the error correction unit 108, and the synchronous reproduction unit 112 as the above-mentioned interference carrier information.

The error correction unit 108 performs the weighting processing such as loss correction, in accordance with the information of carriers that are subjected to interference, thereby reducing the influence of the interference.

As described above, the conventional OFDM receiver monitors the pilot carriers of the received OFDM signal, and determines carriers subjected to the interference, thereby improving the demodulation performance.

When the OFDM signal of the digital terrestrial broadcasting is received, the frequency selectivity interference such as spurious interference or co-channel interference associated with analog television, or jumping-in of a clock of the receiver itself may occur. When the carriers are subjected to such interference, the performance of the demodulation error correction is substantially deteriorated.

In the prior art, it is conceivable that the output from the integrator 113e indicates the level of interference, while the level of interference becomes higher when the influence of the interference upon the OFDM signal is larger. Therefore, when frequency selectivity interference is included in the received OFDM signal, the output of the integrator 113e exhibits a prominent level near a position where the interference exists on the frequency axis.

FIG. 12 shows a state where two kinds of frequency selectivity interference are simultaneously superimposed upon the received OFDM signal. These two kinds of frequency selective interference are referred to as interferences A and B, respectively, and it is assumed that the interferences A and B are in proximity to different positions fA and fB on the frequency axis, respectively. It is further assumed that these interferences A and B are produced by different factors, respectively.

Then, a description will be given of how the conventional detection of interference changes according to a difference between the influences of the interferences A and B upon the received signal. FIGS. 26(a) and 26(b) show the output levels of the integrator 113e, and the average values outputted from the averaging unit 113g of FIG. 25, respectively. Initially, the description is given of a case where there is not much difference between the influences of the interference A and B upon the OFDM signal, as shown in FIG. 26(a). In this case, there is some difference between the output level of the integrator 113e and the average value in proximity to the positions fA and fB on the frequency axis, respectively. Therefore, on the basis of these differences, the comparator 113f can easily detect both of the interferences A and B.

Next, a description is given of a case where the influence of the interference A upon the OFDM signal is quite larger than the influence of the interference B upon the OFDM signal, as shown in FIG. 26(b). In this case, there is a sufficient difference between the output level of the integrator 113e and the average value near the position fA on the frequency axis, while, as compared to this, the difference between the output level of the integrator 113e and the average value near the position fB on the frequency axis is relatively smaller.

This is because the averaging unit 113g calculates the average value of all carriers (all pilot signals) regardless of the magnitude of the signal level (interference level) outputted from the integrator 113e, and accordingly when a signal whose level is locally prominent is outputted from the integrator 113e, the average value outputted from the averaging unit 113g becomes large under the influence of the locally high level.

Therefore, in the case as shown in FIG. 26(b), the comparator 113f easily detects the interference A but has a great difficulty in detecting the interference B. Consequently, an opportunity that an improvement means which performs weighting or loss correction to carriers near the position fB, which are subjected to the interference B, achieves some effects is lost, whereby the modulation error correction performance may be deteriorated.

As described above, the prior art receiver judges the presence or absence of frequency selective interference on the basis of the average value of detected interference levels. Thus, when a plurality of frequency selective interference having difference influences are included, there is a possibility that interference having a relatively smaller influence may be undetected. Consequently, error correction is performed using carriers that are subjected to the interference, whereby demodulation error correction performance is deteriorated.

As another prior art, there is an interference detection correction method that is described in Japanese Patent No. 2954570 (pages 8-9. FIG. 2) (herein after, referred to as a second prior art). In this second prior art, a distribution value (C/N ratio) of carriers is detected as an interference level.

In this second prior art, an average value of the distribution values in the frequency direction is calculated, and carriers having distribution values that are larger than the calculated average value are detected as carriers that are subjected to frequency selective interference, thereby performing loss correction. Also in this case, the presence or absence of the frequency selective interference is judged on the basis of the average value of detected interference levels as in the above-mentioned case, so that when there are a plurality of frequency selective interference having different degrees of influences, interference having a relative smaller degree of influence may not be detected. Accordingly, error correction is performed unfavorably using the carriers that to the interference, whereby the demodulation error correction performance may be deteriorated.

The second prior art further describes another method by which the minimum value of distribution values in the frequency direction is obtained, and loss correction is performed to carriers having larger values than this minimum value, as another interference detection/correction method. However, in this interference detection/correction method, a following erroneous operation may occur. That is, when a signal that includes no operation frequency selective interference and has been passed through a low C/N transmission line is received, the distribution values of the carriers may vary. In such case, when the minimum value of the distribution values in the frequency direction is obtained to perform loss correction for carriers that have larger values than the minimum value, carriers having larger distribution values than the minimum value are subjected to the loss correction. Consequently, there may be some carriers that are not affected by frequency selective interference but are subjected to loss correction processing for a reason that is different from the primary object. This may contrarily result in reduction of the modulation error correction performance.

The second prior art further describes, as still another interference detection/correction method, a method by which the average value and the minimum value of distribution values in the frequency direction are obtained, then a threshold level is set between the minimum value and the average value, and loss correction is performed to carriers having larger values than the threshold level. Also in this case, when there is frequency selective interference having a prominent interference level, the average value is unfavorably increased under the influence of this high level, and thus the threshold level may vary according to the states of interference. Consequently, when a plurality of frequency selective interference having different degrees of influences are included, interference having a relative smaller influence may not be detected, whereby the demodulation error correction performance may be deteriorated.

The second prior art further describes another method by which interference detection is performed utilizing a fact that the spectrum is known, or the interference level has a prominent value in the case of co-channel interference in the analog television broadcasting, as still another interference detection/correction method. However, even when this method is employed, appropriate interference detection algorithm cannot always be performed to frequency selective interference other than the co-channel interference in the analog television broadcasting.

As described above, even when the interference detection/correction method according to the second prior art is employed, there are some situations where appropriate interference detection and error correction cannot be carried out, depending on the interference state of the transmission line, resulting in degradation in demodulation or error correction ability.

The present invention is made in view of the above-mentioned conventional problems. This invention has for its object to provide a receiving apparatus and a receiving method that, when receiving a multi-carrier signal such as an OFDM signal and performing demodulation and error correction, can detect influences on the multi-carrier signal with great accuracy, and suppress deterioration in demodulation error correction performance even when there are a plurality of frequency selective interference having different degrees of influences.

DISCLOSURE OF THE INVENTION

According to a first aspect of the present invention, there is provided a receiver that receives a frequency division multiplex (herein after, referred to as FDM) transmission signal which has been modulated with information signals to which plural carrier waves (herein after, referred to as carriers) are assigned, respectively, which carriers are generated at different frequencies within a transmission band, including: a reference value calculation unit for calculating a reference value that reflects characteristics of a transmission line and is hardly affected by interference, on the basis of the received FDM transmission signal; an interference detection unit for detecting the degree of influence by frequency selective interference, as an interference level, on the basis of the received FDM transmission signal; a reliability determination unit for determining a reliability level of the carriers that constitute the received FDM transmission signal on the basis of the reference value and the interference level; and an error correction unit for performing error correction of the received FDM transmission signal on the basis of the determined reliability level.

Therefore, it is possible to accurately determine a carrier that has been subjected to frequency selective interference, and perform error correction in accordance with the degree of influence by the interference, thereby improving demodulation error correction ability.

According to a second aspect of the present invention, the receiver of the first aspect includes an interference average calculation unit for calculating an average of the interference levels detected by the interference detection unit, and the reliability determination unit determining a carrier that is subjected to the frequency selective interference, on the basis of the average calculated by the interference average calculation unit and the interference level, and determining the reliability level of the carriers that constitute the received FDM transmission signal on the basis of the reference value.

Therefore, it is possible to provide a receiver that can solve the problem that a floor which is included in the detected interference level is misidentified as frequency selective interference and subjected to error correction, thereby deteriorating the demodulation error correction ability.

According to a third aspect of the present invention, the receiver of the first aspect includes an interference average calculation unit for calculating an average of the interference levels detected by the interference detection unit; an interference determination unit for determining the degree of influences by the interference over the transmission band, on the basis of the calculated average of the interference levels, and outputting the determined level as an interference determination level; and the reliability determination unit controlling the determined reliability level according to the output from the interference determination unit.

Therefore, it is possible to avoid the problem that interference existing over all carriers, such as fading interference, is misidentified as that frequency selective interference exists over all carriers, and thus the reliability level of the carriers becomes too low. Accordingly, even when fading interference occurs, it is possible to prevent deterioration of the demodulation error correction ability.

According to a fourth aspect of the present invention, there is provided a receiver that receives an FDM transmission signal which has been modulated with information signals to which plural carriers are assigned, respectively, which carriers are generated at different frequency within a transmission band, and in which pilot signals have been inserted as reference for detection of the plural carriers that have been modulated with the information signals, including: a demodulation unit for demodulating the information signal from the received FDM signal; a reference value calculation unit for calculating an average power of channel characteristics of the carriers on the basis of the pilot signals that have been inserted into the received FDM signal, and outputs the average power as a reference value; an interference detection unit for detecting the degree of influence by frequency selective interference for the plural carriers of the received FDM signal, as an interference level; a reliability determination unit for setting one or plural threshold values on the basis of the reference value, performing a comparison between the threshold value and the interference level, determining reliability of the plural carriers on the basis of the comparison result, and outputting the determined reliability as a reliability level; and an error correction unit for subjecting the demodulated signal to error correction on the basis the reliability level.

Therefore, the interference level can be determined on the basis of the threshold value that reflects the channel characteristics, whereby it is possible to accurately determine a carrier that has been subjected to frequency selective interference, and perform error correction in accordance with the degree of influence by the interference, thereby improving the demodulation error correction ability.

According to a fifth aspect of the present invention, there is provided a receiver that receives an FDM transmission signal which has been modulated with information signals to which plural carriers are assigned, respectively, which carriers are generated at different frequencies within a transmission band, including: a demodulation unit for demodulating the information signal from the received FDM transmission signal; a reference value calculation unit for calculating an average power of the plural carriers that constitute the received FDM signal, and outputting the average power as a reference value; an interference detection unit for detecting the degree of influence by frequency selective interference for the plural carriers in the received FDM signal, as an interference level; a reliability determination unit for setting one or plural threshold values on the basis of the reference value, performing a comparison between the threshold value and the interference level, determining reliability of the plural carriers on the basis of the comparison result, and outputting the determined reliability as a reliability level; and an error correction unit for subjecting the demodulated signal to error correction on the basis of the reliability level.

Therefore, the interference level can be determined on the basis of the threshold value that reflects the channel characteristics, whereby it is possible to accurately determine a carrier that has been subjected to frequency selective interference, and perform error correction in accordance with the degree of influence by the interference, thereby improving the demodulation error correction ability.

According to a sixth aspect of the present invention, there is provided a receiver that receives an FDM transmission signal which has been modulated with information signal to which plural carriers are assigned, respectively, which carriers are generated at different frequencies within a transmission band, and in which pilot signals have been inserted as reference for detection of the plural carriers that have been demodulated with the information signals, including: a demodulation unit for demodulating the information signal from the received FDM transmission signal; a reference value calculation unit for calculating an average power of channel characteristics of the carriers on the basis of the pilot signals that have been inserted into the received FDM signal, and outputting the average power as a reference value; an interference detection unit for detecting the degree of influence by frequency selective interference for the plural carriers in the received FDM signal, as an interference level; an interference average calculation unit for setting one or plural first threshold values on the basis of the reference value, performing a first comparison between the interference level and the first threshold value, selecting the interference levels to be averaged, on the basis of the first comparison result, and calculating an average of the selected interference levels to be outputted as an interference average level; a reliability determination unit for performing a second comparison between the interference level and the interference average level, determining a carrier that has been subjected to frequency selective interference on the basis of the second comparison result, setting one or plural second threshold values on the basis of the reference value, performing a third comparison between the interference level of the carrier that has been subjected to the frequency selective interference and the second threshold value, determining reliability of the plural carriers on the basis of the third comparison result, and outputting the determined reliability as a reliability level; and an error correction unit for subjecting the demodulated signal to error correction on the basis of the reliability level.

Therefore, even when there is a floor in the detected interference level, the influence of the floor is eliminated to judge the original interference level, whereby it is possible to more accurately determine a carrier that has been subjected to frequency selective interference, and perform error correction in accordance with the degree of influence by the interference, thereby improving the demodulation error correction ability.

According to a seventh aspect of the present invention, there is provided a receiver that receives an FDM transmission signal which has been modulated with information signals to which plural carriers are assigned, respectively, which carriers are generated at different frequencies within a transmission band, including: a demodulation unit for demodulating the information signals from the received FDM transmission signal; a reference value calculation unit for calculating an average power of the plural carriers that constitute the received FDM signal, and outputting the calculated average power as a reference value; an interference detection unit for detecting the degree of influence by frequency selective interference for the plural carriers of the received FDM signal, as an interference level; an interference average calculation unit for setting one or plural first threshold values on the basis of the calculated reference value, performing a first comparison between the interference level and the first threshold value, selecting the interference levels to be averaged, on the basis of the first comparison result, and calculating an average of the selected interference levels to be outputted as an interference average level; a reliability determination unit for performing a second comparison between the interference level and the interference average level, determining a carrier that has been subjected to frequency selective interference on the basis of the second comparison result, setting one or plural second threshold values on the basis of the reference value, performing a third comparison between an interference level of the carrier that has been subjected to the frequency selective interference and the second threshold value, determining reliability of the plural carriers on the basis of the third comparison result, and outputting the determined reliability as a reliability level; and an error correction unit for subjecting the demodulated signal to error correction on the basis of the reliability level.

Therefore, even when there is a floor in the detected interference level, the influence of the floor is excluded to determine the original interference level, whereby it is possible to more accurately determine a carrier that has been subjected to frequency selective interference, and perform error correction in accordance with the degree of influence by the interference, thereby improving the demodulation error correction ability.

According to an eighth aspect of the present invention, in the receiver of the sixth or seventh aspects, the interference average calculation unit sets the first threshold value at one or plural fixed values.

Therefore, even when a floor is included in the interference level, the influence of the floor is excluded to determine the original interference level, and further when plural first threshold values are employed, the interference average level can be outputted as a multi-level value and thus flexible calculation of the interference average level can be performed in accordance with the interference levels, whereby it is possible to more accurately determine a carrier that has been subjected to the frequency selective interference, and perform error correction in accordance with the degree of influence by the interference, thereby further improving the demodulation error correction ability.

According to a ninth aspect of the present invention, in the receiver of the sixth or seventh aspects, the interference average calculation unit performs a first comparison between the interference level and the first threshold value, correcting the interference level on the basis of the first comparison result, calculating an average of the interference levels including the corrected interference level, and outputting the calculated average as the interference average level.

Therefore, the average of the interference levels including the corrected interference level is employed as the interference average level, whereby the floor detection accuracy is enhanced, and even when a floor is included in the detected interference level, the influence of the floor is excluded to determine the original interference level, accordingly it is possible to more accurately determine a carrier that has been subjected to frequency selective interference, and perform error correction in accordance with the degree of influence by the interference, thereby improving the demodulation error correction ability more reliably.

According to a tenth aspect of the present invention, in the receiver of the sixth or seventh aspects, the interference average calculation unit performs a first comparison between the interference level and the first threshold value, selects the interference levels to be averaged, on the basis of the first comparison result, calculates an average of the selected interference levels, multiplies the calculated average of the interference average levels by a predetermined coefficient to raise the average, and outputting the raised average as the interference average level.

Therefore, the raised average level is employed as the interference average level, whereby the floor detection accuracy is improved, and thus even when a floor is included in the detected interference level, the influence of the floor is excluded to determine the original interference level, accordingly it is possible to more accurately determine a carrier that has been subjected to frequency selective interference, and perform error correction in accordance with the degree of influence by the interference, thereby further improving the demodulation error correction ability.

According to an eleventh aspect of the present invention, in the receiver of the sixth or seventh aspects, the reliability determination unit sets the second threshold value at one or plural fixed values.

Therefore, it is possible to eliminate the process for calculating the second threshold value, and when plural second threshold values are utilized, the reliability determination level can be outputted as a multi-level value, and the reliability level corresponding to the interference level can be flexibly calculated, whereby even when the detected interference level includes a floor, the influence of the floor is excluded to determine the original interference level, accordingly it is possible to more accurately determine a carrier that has been subjected to frequency selective interference, and perform error correction in accordance with the degree of influence by the interference, thereby further improving the demodulation error correction ability.

According to a twelfth aspect of the invention, in the receiver of the sixth or seventh aspects, the reliability determination unit calculates a difference between the interference level and the interference average level as a differential level, determines a carrier that has been subjected to frequency selective interference on the basis of the differential level, performs a third comparison between the second threshold value and the differential level of the carrier that has been determined to be subjected to the frequency selective interference, determines the reliability of the plural carriers stepwise on the basis of the third comparison result, and outputs the determined reliability as the reliability level.

Therefore, even when a floor is included in the detected interference level, the influence of the floor is excluded to determine the original interference level, whereby it is possible to more accurately determine a carrier that has been subjected to frequency selective interference, and perform error correction in accordance with the degree of influence by the interference, thereby improving the demodulation error correction ability.

According to a thirteenth aspect of the present invention, there is provided a receiver that receives an FDM transmission signal which has been modulated with information signals to which plural carriers are assigned, respectively, which carriers are generated at different frequencies within a transmission band, and in which pilot signals have been inserted as reference for detection of the plural carriers that have been modulated with the information signals, including: a demodulation unit for demodulating the information signal from the received FDM transmission signal; a reference value calculation unit for calculating an average power of channel characteristics of the carriers on the basis of the pilot signals that have been inserted into the received FDM signal, and outputting the average power as a reference value; an interference detection unit for detecting the degree of influence by frequency selective interference for the plural carriers of the received FDM signal, as an interference level; an interference average calculation unit for calculating an average of the interference levels, and outputting the calculated average as an interference average level; an interference determination unit for performing a comparison between the interference average level calculated by the interference average calculation unit and an interference determination reference value; a reliability determination unit for setting one or plural third threshold values on the basis of the reference value, performing a fourth comparison between the third threshold value and the interference level, determining reliability of the plural carriers on the basis of the fourth comparison result, correcting the reliability of the plural carriers on the basis of the interference determination level, and outputting the corrected reliability as a reliability level; and an error correction unit for subjecting the demodulated signal to error correction on the basis of the reliability level.

Therefore, it is possible to provide a receiver that can solve the problem that interference existing over all carriers such as fading interference is misidentified as frequency selective interference, whereby the reliability of the carriers becomes too low and the demodulation error correction ability is deteriorated contrarily. Accordingly, it is possible to improve the demodulation error correction ability also for the fading interference.

According to a fourteenth aspect of the present invention, there is provided a receiver that receives an FDM transmission signal which has been modulated with information signal to which plural carriers are assigned, respectively, which carriers are generated at different frequencies within a transmission band, including: a demodulation unit for demodulating the information signal from the received FDM transmission signal; a reference value calculation unit for calculating an average power of the plural carriers that constitute the received FDM signal, and outputting the average power as a reference value; an interference detection unit for detecting the degree of influence by frequency selective interference for the plural carriers of the received FDM signal, as an interference level; an interference average calculation unit for calculating an average of the interference levels, and outputting the calculated average as an interference average level; an interference detection unit for performing a comparison between the interference average level calculated by the interference average calculation unit and an interference determination reference value; a reliability determination unit for setting one or plural first threshold values on the basis of the reference value, performing a first comparison between the first threshold value and the interference level, determining reliability of the plural carriers on the basis of the first comparison result, correcting the reliability of the plural carriers on the basis of an interference determination level, and outputting the corrected reliability as a reliability level; and an error correction unit for subjecting the demodulated signal to error correction on the basis of the reliability level.

Therefore, it is possible to provide a receiver that can solve the problem that interference existing over all carriers such as fading interference is misidentified as frequency selective interference, whereby the reliability of the carriers becomes too low and thus the demodulation error correction ability is deteriorated contrarily. Accordingly, it is possible to improve the demodulation error correction ability also for the fading interference.

According to a fifteenth aspect of the present invention, in the receiver of the thirteenth or fourteenth aspects, the interference determination unit sets the third threshold value at one or plural values on the basis of the reference value, performs a fourth comparison between the interference level and the third threshold, determines the degree of influence by the interference over the transmission band on the basis of the fourth comparison result, and outputs the determined level as the interference determination level.

Therefore, when plural third threshold values are utilized, the interference determination level can be outputted as a multi-level value, and thus the interference determination level corresponding to the interference average level can be flexibly calculated, whereby it is possible to solve the problem that interference over all carriers such as fading interference is misidentified as frequency selective interference, whereby the reliability of the carriers becomes too low and thus the demodulation error correction performance is deteriorated contrarily. Accordingly, it is possible to further improve the demodulation error correction ability also for the fading interference.

According to a sixteenth aspect of the present invention, in the receiver of the thirteenth or fourteenth aspects, the interference determination unit sets the third threshold value at one or plural fixed values.

Therefore, it is possible to eliminate the process for calculating the third threshold value, and when plural third threshold values are utilized, the interference determination level can be outputted as a multi-level value, and the interference determination level corresponding to the interference average level can be flexibly calculated, whereby it is possible to solve the problem that interference existing over all carriers such as fading interference is misidentified as frequency selective interference, whereby the reliability of the carriers becomes too low and thus the demodulation error correction performance is deteriorated contrarily. Accordingly, it is possible to further improve the demodulation error correction ability also for the fading interference.

According to a seventeenth aspect of the present invention, there is provided a method for receiving an FDM transmission signal which has been modulated with information signals to which plural carriers are assigned, respectively, which carriers are generated at different frequencies within a transmission band, and in which pilot signals have been inserted as reference for detection of the plural carriers that have been modulated with the information signals, including: a first step of demodulating the information signal from the received FDM transmission signal; a second step of calculating an average power of channel characteristics of the carriers on the basis of the pilot signals that have been inserted into the received FDM signal, and outputting the average power as a reference value; a third step of detecting the degree of influence by frequency selective interference for the plural carriers of the received FDM signal, as an interference level; a fourth step of setting one or plural threshold values on the basis of the reference value, performing a comparison between the threshold value and the interference level, determining reliability of the plural carriers on the basis of the comparison result, and outputting the determined reliability as a reliability level; and a fifth step of subjecting the demodulated signal to error correction on the basis of the reliability level.

Therefore, it is possible to more accurately determine a carrier that has been subjected to frequency selective interference, and perform error correction in accordance with the degree of influence by the interference, thereby improving the demodulation error correction ability.

According to an eighteenth aspect of the present invention, there is provided a method for receiving an FDM transmission signal which has been modulated with information signals to which plural carriers are assigned, respectively, which carriers are generated at different frequencies within a transmission band, and in which pilot signals have been inserted as reference for detection of the plural carriers that have been modulated with the information signals, including: a first step of demodulating the information signals from the received FDM transmission signal; a second step of calculating an average power of channel characteristics of the carriers on the basis of the pilot signals that have been inserted into the received FDM signal, and outputting the average power as a reference value; a third step of detecting the degree of influence by frequency selective interference for the plural carriers of the received FDM signal, as an interference level; a fourth step of setting one or plural first threshold values on the basis of the reference value, performing a first comparison between the interference level and the first threshold value, selecting the interference levels to be averaged on the basis of the first comparison result, calculating an average of the selected interference levels, and outputting the calculated average as an interference average level; a fifth step of performing a second comparison between the interference level and the interference average level, determining a carrier that has been subjected to frequency selective interference on the basis of the second comparison result, setting one or plural second threshold values on the basis of the reference value, performing a third comparison between an interference level of the carrier that has been subjected to the frequency selective interference and the second threshold value, determining reliability of the plural carrier on the basis of the third comparison result, and outputting the determined reliability as a reliability level; and a sixth step of subjecting the demodulated signal to error correction on the basis of the reliability level.

Therefore, it is possible to provide a receiving method that can solve the problem that a floor which is included in the detected interference level is misidentified as frequency selective interference to perform error correction, thereby deteriorating the demodulation error correction ability.

According to a nineteenth aspect of the present invention, there is provided a method for receiving an FDM transmission signal which has been modulated with information signals to which plural carriers are assigned, respectively, which carriers are generated at different frequencies within a transmission band, and in which pilot signals have been inserted as reference for detection of the plural carriers that have been modulated with the information signals, including: a first step of demodulating the information signals from the received FDM transmission signal; a second step of calculating an average power of channel characteristics of the carriers on the basis of the pilot signals that have been inserted into the received FDM transmission signal, and outputting the average power as a reference value; a third step of detecting the degree of influence by frequency selective interference for the plural carriers of the received FDM signal, as an interference level; a fourth step of calculating an average of the interference levels, and outputting the calculated average as an interference average level; a fifth step of determining the degree of influence by the interference over the transmission band on the basis of the interference average level, and outputting the determined level as an interference determination level; a sixth step of setting one or plural first threshold values on the basis of the reference value, performing a first comparison between the first threshold value and the interference level, determining reliability of the plural carriers on the basis of the first comparison result, correcting the reliability of the plural carriers on the basis of the interference determination level, and outputting the corrected reliability as a reliability level; and a seventh step of subjecting the demodulated signal to error correction on the basis of the reliability level.

Therefore, it is possible to provide a receiver which can solve the problem that interference existing over all carriers, such as fading interference, is misidentified as that frequency selective interference exists over all carriers, whereby the reliability level of the carriers becomes too low. Accordingly, even when fading interference occurs, it is possible to avoid deterioration of the demodulation error correction ability.

As described above, according to the present invention, in receiving, demodulation, and error correcting a multi-carrier signal such as an OFDM signal, even when the signal is simultaneously subjected to a plurality of frequency selective interference having different degrees of influences affecting on the multi-carrier signal, it is possible to detect the influence with great accuracy, thereby improving the demodulation error correction performance.

BRIEF DESCRIPTION OF THE DRAWINGS

FIG. 4(*a*) is a diagram showing a direction along when the time-based interpolation is performed on the basis of the pilot signals, and FIG. 4(*b*) is a diagram showing the pilot signals, and temporal arrangement that enables to obtain channel characteristics that have been subjected to time-based interpolation.

FIG. 5(*a*) is a diagram showing pilot signals, and a direction along which interpolation is performed in the frequency axis direction on the basis of the pilot signals and signals that have been subjected to the time-based interpolation with the pilot signals, and FIG. 5(*b*) is a diagram showing pilot signals, signals that have been subjected to time-based interpolation, and signals that have been subjected to frequency-based interpolation.

FIG. 7(*a*) is a diagram showing a direction in which interpolation along the time axis is performed on the basis of error signals, and FIG. 7(*b*) is a diagram showing error signals, and signals that have been subjected to time-based interpolation.

FIG. 9(*a*) is a diagram showing a direction in which interpolation along the frequency axis is performed on the basis of the interference level, and FIG. 9(*b*) is a diagram showing interference levels, and signals that have been subjected to the frequency-based interpolation.

FIG. 10(*a*) is a diagram showing an example of an interference level having two peaks, and FIG. 10(*b*) is a diagram showing the result of determination for the reliability level.

FIG. 13(*a*) is a diagram showing a case where the threshold value is set at a low value for interferences A and B having much difference in peak, so that these two interferences can be detected, and FIG. 13(*b*) is a diagram showing a case where the threshold value is set at a low value for interferences A and B having large difference in peak, so that these two interferences can be detected.

FIG. 26 are diagrams showing output levels of the integrator 113e of the prior art and average values that are outputted from the averaging unit 113g.

BEST MODE FOR CARRYING OUT THE INVENTION

Embodiment 1

A first embodiment corresponds to inventions described in the first, fourth, fifth, and seventeenth aspects of the present invention. In this embodiment, frequency selective interference is detected using, as a threshold value, a reference value that varies with channel characteristics but hardly varies with interference levels, thereby accurately detecting the frequency selective interference and improving demodulation error correction performance.

A multi-carrier receiver according to the first embodiment will be described with taking a case where this multi-carrier receiver is adopted as an apparatus for receiving an OFDM transmission signal.

Figure 1:
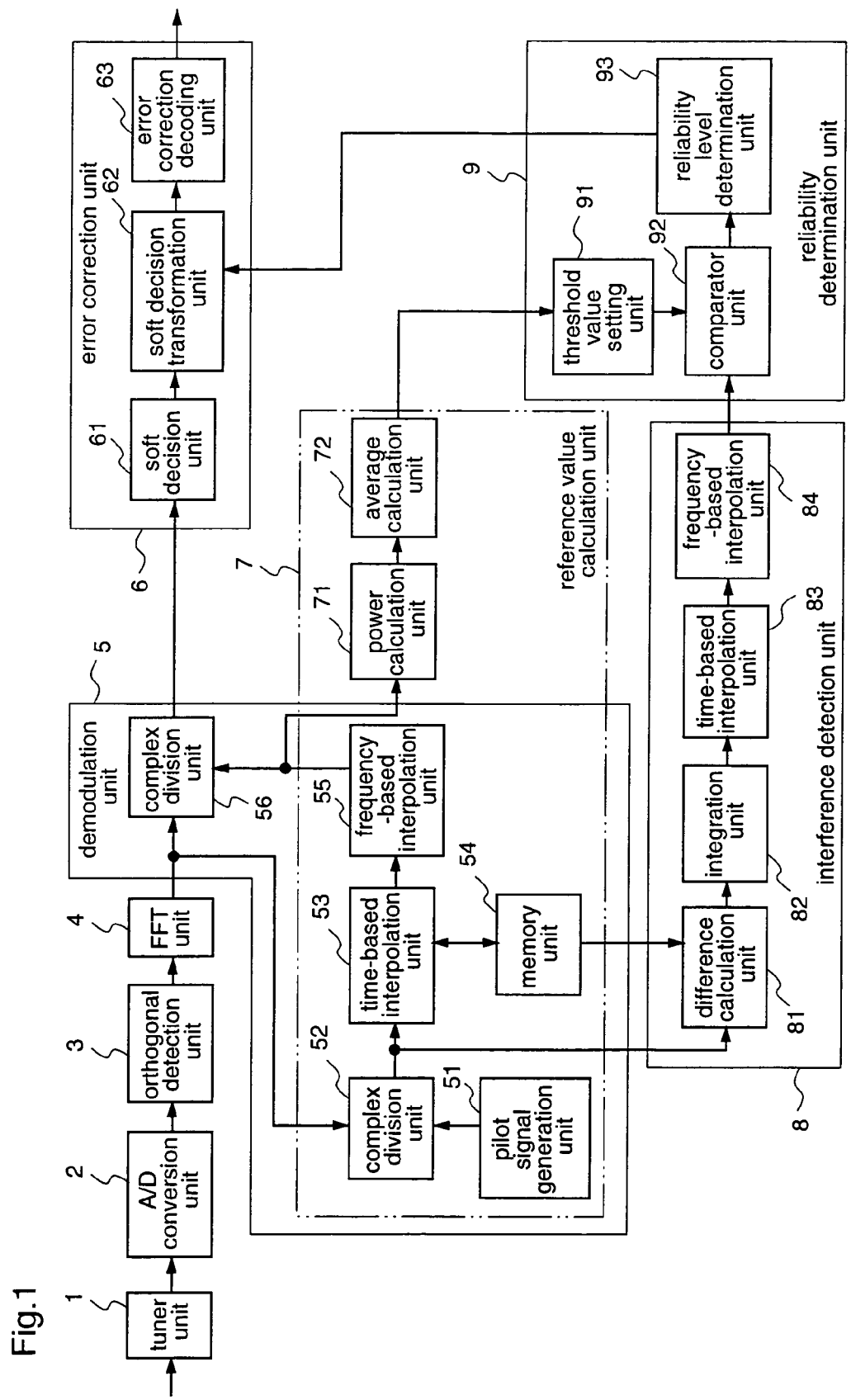
FIG. 1 is a diagram illustrating an entire construction of a multi-carrier receiver according to a first embodiment of the present invention.

FIG. 1 is a diagram showing an entire construction of a multi-carrier receiver according to the first embodiment.

In FIG. 1, an OFDM transmission signal that is supplied to the multi-carrier receiver through a receiving antenna or a cable is subjected to station selection processing by a tuner unit 1 using a station issue signal, then converted into a digital signal by an A/D conversion unit 2, and inputted to an orthogonal detection unit 3. The orthogonal detection unit (herein after, referred to as a detection unit) 3 subjects the input signal to orthogonal detection, to convert the same into a baseband OFDM signal, and outputs the baseband OFDM signal. A FFT unit (signal transform unit) 4 subjects the baseband OFDM signal to fast Fourier transform, to transform the signal in time domain to a signal in frequency domain.

The FFT output indicates the phase and amplitude of each carrier in the OFDM transmission signal and, more specifically, is treated in a form of a complex signal having an I-axis level and a Q-axis level independently.

A demodulation unit 5 subjects the inputted frequency-domain OFDM signal to differential detection or synchronous detection, to demodulate information signals that are assigned to plural carriers, and outputs the obtained result to an error correction unit 6 as a demodulation signal.

A reference value calculation unit 7 estimates channel characteristics of carriers within a transmission band, on the basis of the received signal, calculates an average power of the channel characteristics of the carriers to obtain a reference value, and outputs the reference value to a reliability determination unit 9. This reference value is a signal which varies with changes in the channel characteristics, for example, by the influence of fading (phenomenon in which the phase and amplitude of the received signal vary with time at a mobile unit reception or the like), but is hardly affected by frequency selective interference.

An interference detection unit 8 detects an interference level for each carrier, which indicates the degree of influence by the frequency selective interference in the received signal, and informs a reliability determination unit 9 of the detected interference level. In this first embodiment, the interference detection unit 8 detects the interference level on the basis of the signal inputted from the demodulation unit 5.

The reliability determination unit 9 determines the reliability level of each interference level for each carrier, on the basis of the interference level detected by the interference detection unit 8 and the reference value calculated by the reference value calculation unit 7, and outputs the determined reliability level to an error correction unit 6.

The error correction unit 6 performs soft decision for the OFDM signal that has been demodulated by the demodulation unit 5, corrects the signal on the basis of the reliability level obtained by the reliability determination unit 9, and performs error correction.

In this receiver according to the first embodiment, the reference value calculation unit 7 and the interference detection unit 8 carry out processing corresponding to second and third steps of a receiving method as defined in the seventeenth aspect discussed above, the reliability determination unit 9 carries out processing corresponding to a fourth step thereof, and the error correction unit 6 carries out processing corresponding to a fifth step thereof.

The respective components of the receiver according to the first embodiment will be described in more detail.

The demodulation unit 5 takes a form for performing synchronous detection, and as shown in FIG. 1, it can be constituted by a pilot signal generation unit 51, a complex division unit 52, a time-based interpolation unit 53, a memory unit 54, a frequency-based interpolation unit 55, and a complex division unit 56. In the OFDM signal according to the first embodiment, the pilot signal is inserted periodically at prescribed intervals in the frequency direction and time direction as a detection reference signal. In the case of synchronous detection, this pilot signal is employed as the reference for amplitude and phase equalization.

The pilot signal generation unit 51 generates a known pilot signal at the same timing as the pilot signal that is periodically inserted into the frequency-domain OFDM signal, and outputs the generated signal to the complex division unit 52.

Figure 2:
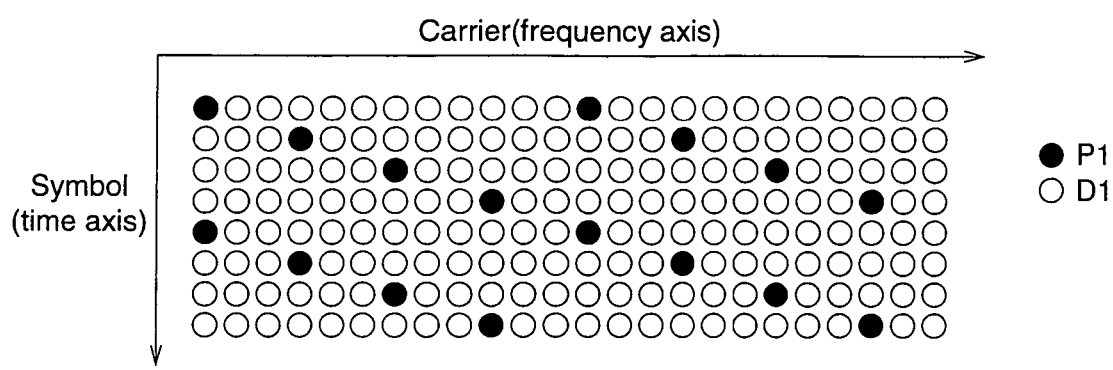
FIG. 2 is a diagram for explaining arrangement of pilot signals.
Figure 3:
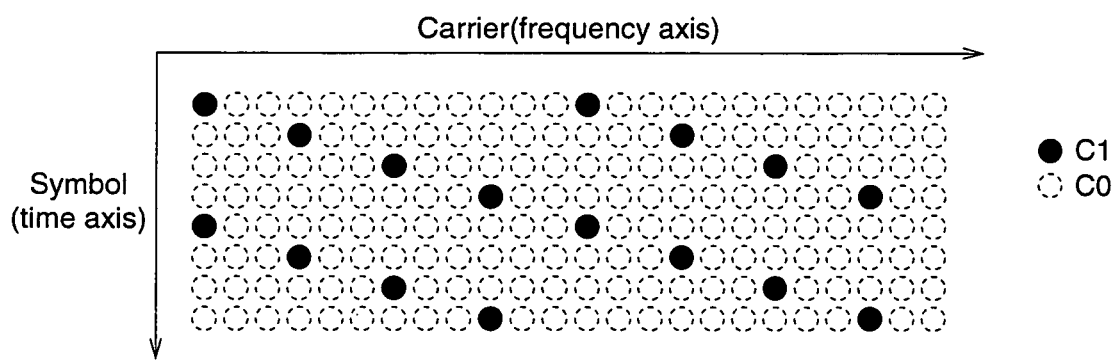
FIG. 3 is a diagram showing arrangement of the pilot signal for obtaining the channel characteristics.

FIG. 2 shows a specific example of pilot signal arrangement. In FIG. 2, D1 denotes a position of a data carrier, and P1 denotes a position of a pilot signal. In this example, the pilot signal is inserted into the frequency-domain OFDM signal in a cycle of 4 symbols. FIG. 3 shows arrangement of channel characteristics of the pilot signal, which are estimated on the basis of the pilot signal arrangement as shown in FIG. 2. In FIG. 3, C1 denotes a position where a channel characteristic of the pilot signal can be obtained. The channel characteristic cannot be obtained at position C0 in FIG. 3.

The complex division unit 52 in FIG. 1 subjects the pilot signal that is periodically inserted into the frequency-domain OFDM signal to complex division with the known pilot signal (reference value) that has been generated by the pilot signal generation unit 51, to estimate the channel characteristic of the pilot signal, and outputs the estimated channel characteristic to the time-based interpolation unit 53.

The time-based interpolation unit 53 stores the channel characteristics of the pilot signal, which have been obtained by the complex division unit 52, successively into the memory unit 54 and, for carriers which are located at the same position on the frequency axis as the pilot signal, the channel characteristics of the pilot signal that are stored in the memory unit 54 and are located at the same position are read from the memory unit 54 and utilized. Consequently, the channel characteristics which have been interpolated in the time axis direction (0th-order interpolation) are obtained at constant carrier intervals, and outputted to the frequency-based interpolation unit 55.

Here, the time-based interpolation unit 53 may have a construction that stores the channel characteristics of the pilot signal, which have been obtained by the complex division unit 52, successively into the memory unit 54, and subjects carriers that are located at the same positions on the frequency axis as the pilot signal to interpolation (1st-order interpolation) on the basis of the channel characteristic of the pilot signal, which has been obtained by the complex division unit 52, and the channel characteristic of a pilot signal preceding on the time axis exactly by one cycle, which is stored in the memory unit 54, thereby to output the obtained result to the frequency-based interpolation unit 55. Thereby, high-accuracy interpolation that follows the time variations of the channel characteristic can be performed, thereby improving the demodulation performance. Also in this case, like the case of 0th-order interpolation, the channel characteristics that have been subjected to the interpolation in the time axis direction (1st-order interpolation) are obtained at constant carrier intervals, and the obtained signal is inputted to the frequency-based interpolation unit 55.

Figure 4A:
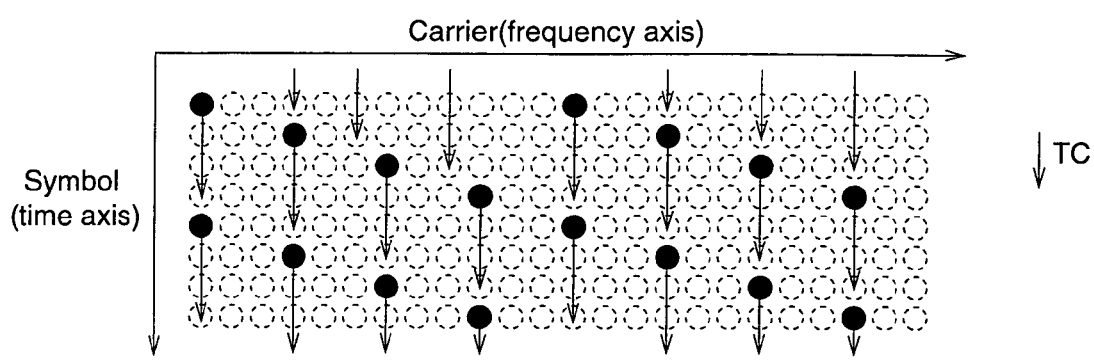
FIG. 4 are diagrams for explaining a concept of time-based interpolation with pilot signals.
Figure 4B:
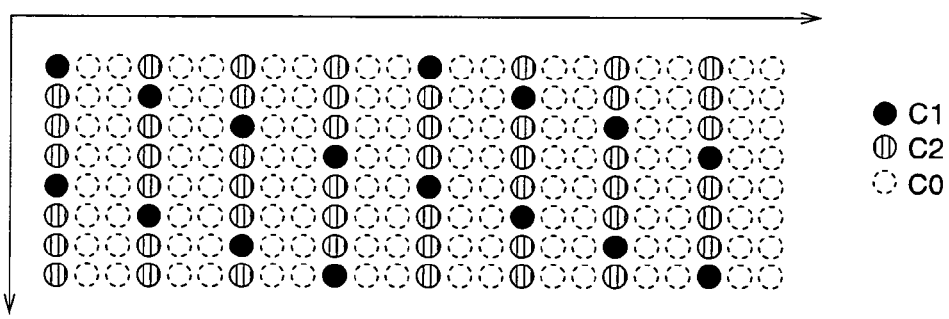

FIGS. 4(*a*) and 4(*b*) are diagrams showing the concept of time-based interpolation processing on the basis of the arrangement of channel characteristics of the pilot signal as shown in FIG. 3. Arrows TC in FIG. 4(*a*) show positions where the time-based interpolation is performed and the order of the interpolation. In FIG. 4(*b*), C1 show positions where the channel characteristics of the pilot signal are obtained, and C2 show positions where channel characteristics that are time-based interpolated are obtained. The channel characteristics cannot be obtained at positions C0 in FIG. 4(*b*).

Figure 5A:
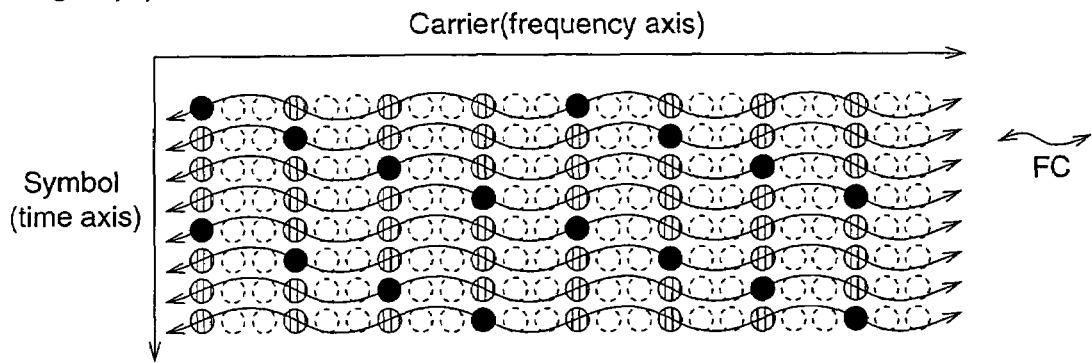
FIG. 5 are diagram for explaining a concept of frequency-based interpolation with pilot signals.
Figure 5B:
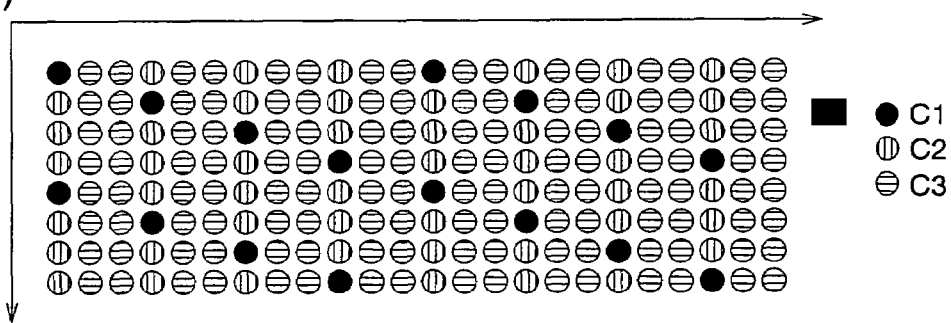

The frequency-based interpolation unit 55 in FIG. 1 passes the channel characteristics at constant carrier intervals on the frequency axis, which have been obtained by the time-based interpolation unit 53, through a filter, to perform interpolation in the frequency axis direction, and outputs the obtained characteristics to the complex division unit 56 as channel characteristics for all carriers. FIGS. 5(*a*) and 5(*b*) are conceptual diagrams showing the frequency-based interpolation processing on the basis of the time-based interpolation result as shown in FIG. 4(*b*). Curved lines FC in FIG. 5(*a*) show positions at which the frequency-based interpolation is performed, and the order of the interpolation. In FIG. 5(*b*), C1 shows positions where the channel characteristics of the pilot signal are obtained. C3 in FIG. 5(*b*) show positions where channel characteristics that are frequency-based interpolated are obtained.

The complex division unit 56 in FIG. 1 subjects each carrier signal that is inputted to the demodulation unit 5 to complex division with the channel characteristics of the carriers, which have been obtained by the frequency-based interpolation unit 55, and outputs the obtained signal as a demodulation signal.

Next, the reference value calculation unit 7 according to the first embodiment will be described. The reference value calculation unit 7 can be constituted by the pilot signal generation unit 51, the complex division unit 52, the time-based interpolation unit 53, the memory unit 54, the frequency-based interpolation unit 55, a power calculation unit 71, and an average calculation unit 72, as shown in FIG. 1.

The reference value calculation unit 7 according to the first embodiment commonly employs the components of the demodulation unit 5 to utilize a signal that has been obtained by the processing in the demodulation unit 5 at the calculation of the reference value that is hardly affected by the interference level on the basis of the input signal. That is, the signal inputted to the reference value calculation unit is the same OFDM signal of frequency domain as that inputted to the demodulation unit 5, and the pilot signal generation unit 51, the complex division unit 52, the time-based interpolation unit 53, the memory unit 54, and the frequency-based interpolation unit 55 are commonly employed with the demodulation unit 5. Thus, the components which are shared between the demodulation unit 5 and the reference value calculation unit 7 are denoted by the same reference numerals in FIG. 1. Detailed descriptions about parts of the components which are shared between the demodulation unit 5 and the reference value calculation unit 7 are omitted here.

The frequency-based interpolation unit 55 in the reference value calculation unit 7 passes the channel characteristics at constant carrier intervals on the frequency axis, which have been obtained by the time-based interpolation unit 53, through a filter, to perform interpolation in the frequency axis direction, and outputs the obtained characteristics to the complex division unit 56 and the power calculation unit 71 as the channel characteristics for all carriers.

The power calculation unit 71 receives the channel characteristics for all the carriers, which are outputted from the frequency-based interpolation unit 55, then performs power calculation for this signal, and outputs the calculated power to the average calculation unit 72 as power indicating the channel characteristics for all carriers.

The average calculation unit 72 obtains the average power of the channel characteristics for all carriers, which are outputted from the power calculation unit 71, and outputs the calculated average power. Here, the calculation of the average power may be executed by integrating the power of the channel characteristics for all carriers across the frequency domain and time domain.

The average power of the channel characteristics for all carriers, which has been obtained by the above-mentioned processes, varies with changes in the channel characteristics due to such as fading, but is hardly affected by the frequency selective interference such as spurious interference or co-channel interference of analog television, because the ratio of carriers that are affected by such interference with respect to the all carriers is quite low, and thus the level of the average power for all carriers hardly changes greatly.

Next, the interference detection unit 8 according to the first embodiment will be described. The interference detection unit 8 is constituted by a difference calculation unit 81, an integrator unit 82, a time-based interpolation unit 83, and a frequency-based interpolation unit 84, as shown in FIG. 1.

The interference detection unit 8 according to the first embodiment receives the channel characteristic of the pilot signal, which has been obtained in the processing of the demodulation unit 5, and a channel characteristic of a pilot signal that is preceding by one cycle on the time axis, then detects the interference level for the pilot signal on the basis of a difference between these channel characteristics, i.e., amount of time variation, and interpolates the detected level in the time axis and frequency axis directions, to be outputted as the interference level for all carriers.

Figure 6:
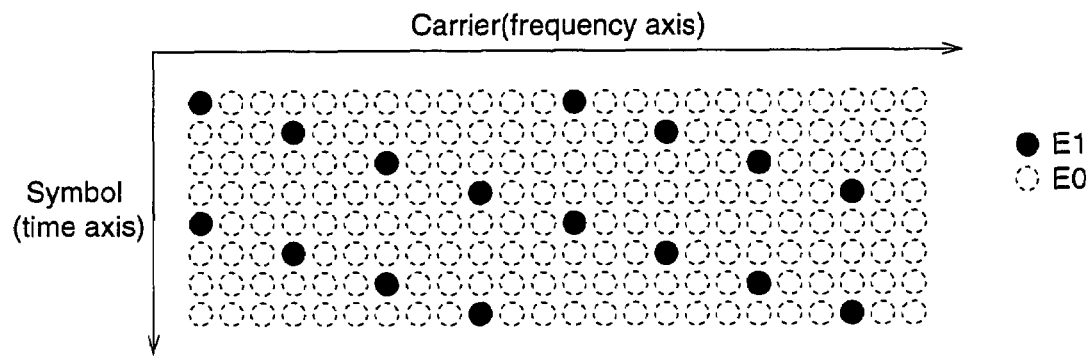
FIG. 6 is a diagram showing arrangement of error signals that are outputted from an error calculation unit according to the first embodiment.

The difference calculation unit 81 in the interference detection unit 8 obtains a complex difference between the channel characteristic of the pilot signal, which is outputted from the complex division unit 52, and the channel characteristic of the pilot signal, which is outputted from the memory unit 54, and further obtains the corresponding power to be outputted to the integrator unit 82. Here, as the channel characteristic of the pilot signal, which is outputted from the memory unit 54, is preceding by one cycle on the time axis to the channel characteristic of the pilot signal, which is outputted from the complex division unit 52, it can be said that the difference calculation unit 81 obtains an amount of changes in the two channel characteristics during one cycle. FIG. 6 shows an arrangement of error signals that are calculated on the basis of the arrangement of the channel characteristics of the pilot signal as shown in FIG. 3. In FIG. 6, E1 shows a position in which an error signal is obtained, and the error signal is not obtained at position E0.

The integrator unit 81 in FIG. 1 integrates the difference between the channel characteristics in each cycle at a position of each pilot signal on the frequency axis, which is obtained by the difference calculation unit 81. The result of the integration indicates an average amount of changes in the channel characteristics of the pilot signal. At a position of the pilot signal that is subjected to frequency selective interference, the amount of changes in the channel characteristics of the pilot signal is large, and therefore the integration result exhibits a high level. Further, the integration results are located at prescribed intervals on the time axis.

The time-base interpolation unit 83 subjects the integration results that are obtained by the integrator unit 82 and are located at prescribed intervals on the time axis, to the interpolation on the time axis, and outputs the result to the frequency-based interpolation unit 84. The time-based interpolation may be either the 0th-order interpolation or the 1st-order interpolation. Consequently, the average amount of changes for a carrier that is located at the same position as the pilot signal on the frequency axis is calculated. Here, the signals that are outputted from the time-based interpolation unit 83 are located at the same positions as the pilot signal on the frequency axis at constant carrier intervals.

Figure 7A:
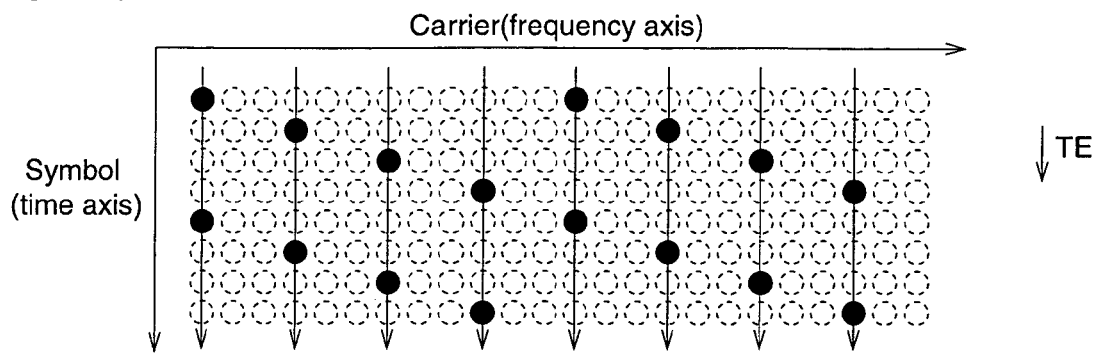
FIG. 7 are diagram showing arrangement of interference levels of error signals, which are outputted from an interference calculation unit.
Figure 7B:
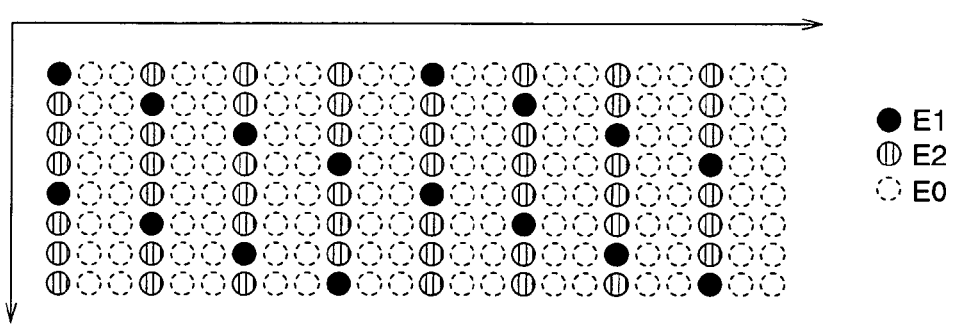

FIGS. 7(*a*) and 7(*b*) are conceptual diagrams showing a time-based interpolation processing on the basis of the arrangement of error signals shown in FIG. 6.

Arrows TE in FIG. 7(*a*) show positions where time-based interpolation including average calculation is performed, and the order of the interpolation. In FIG. 7(*b*), E1 shows positions where error signals are obtained, and E2 shows positions where error signals that have been time-based interpolated are obtained. The error signal is not obtained at positions E0 in FIG. 7(*b*).

Figure 8:
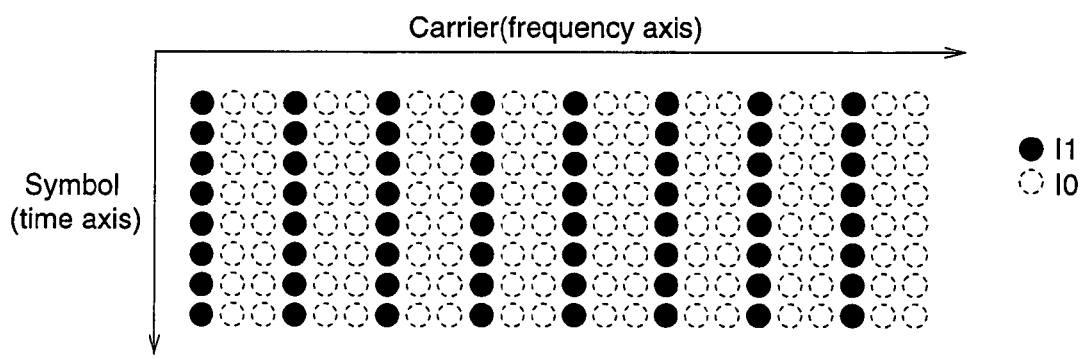
FIG. 8 is a diagram showing arrangement of interference levels that are outputted from the interpolation calculation unit according to the first embodiment.

FIG. 8 shows arrangement of interference levels that are calculated on the basis of the arrangement of the error signals shown in FIG. 7(*b*). In FIG. 8, I1 shows positions where interference levels are obtained. The interference level is not obtained at positions I0 in FIG. 8.

The frequency-based interpolation unit 84 in FIG. 1 passes the signals that have been obtained by the time-based interpolation unit 83 and are located on the frequency axis at constant carrier intervals, through a filter, to perform interpolation in the frequency axis direction, and outputs the obtained result as interference levels for all carriers. The interference levels are high in proximity to carriers that have been subjected to frequency selective interference.

Figure 9A:
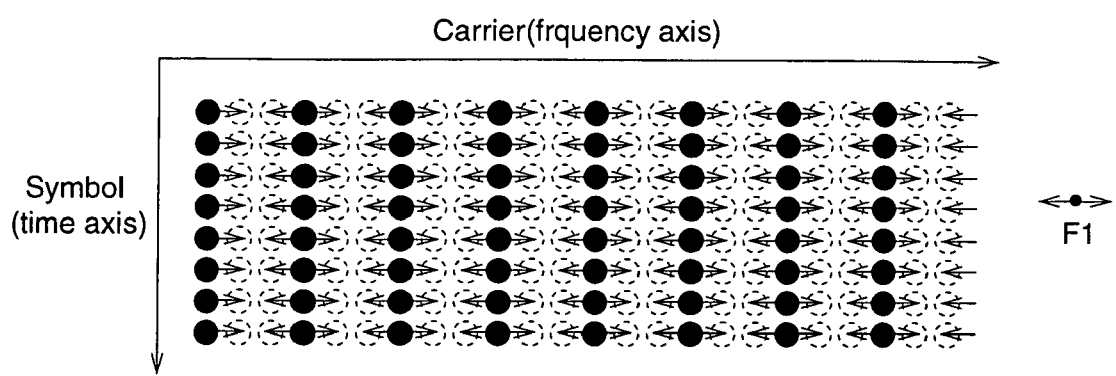
FIG. 9 are diagram for explaining a concept of frequency-based interpolation with interference levels.
Figure 9B:
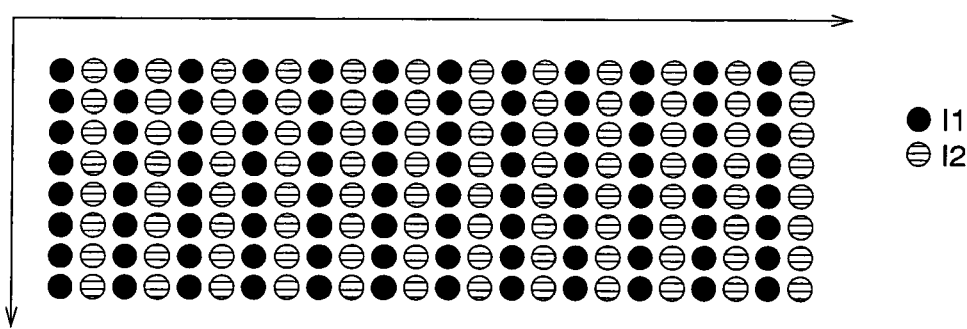

FIGS. 9(*a*) and 9(*b*) are conceptual diagrams showing frequency-based interpolation processing on the basis of the arrangement of interference levels shown in FIG. 8. Arrows F1 in FIG. 9(*a*) show positions where interference levels are obtained, and I2 in FIG. 9(*b*) show positions where interference levels that have been frequency-based interpolated are obtained.

Then, the reliability determination unit 9 according to the first embodiment will be descried. The reliability determination unit 9 can be constituted by a threshold value setting unit 91, a comparator unit 92, and a reliability level determination unit 93 as shown in FIG. 1. The reliability determination unit 9 sets a threshold value on the basis of the reference value that has been calculated by the reference value calculation unit 7, and compares the interference level detected by the interference detection unit 8 with the threshold value, thereby identifying carriers that have been subjected to interference, then successively obtains a signal indicating the degree of influence for each carrier, and outputs the obtained signal to the error correction unit 6 as a reliability level.

The threshold level setting unit 91 sets a threshold value on the basis of the reference value calculated by the reference value calculation unit 7, and outputs the threshold value to the comparator unit 92. This threshold value may be empirically set such that an error rate of the received signal has a minimum value while being compared with the interference level. For example, assuming that the reference value calculated by the reference value calculation unit 7 is P, and a predetermined coefficient is $\alpha$, the threshold value may be set at the product P·$\alpha$. Further, one or more threshold values can be set. It is possible to prepare N pieces of predetermined coefficients $\alpha 1, \alpha 2, \alpha 3, \ldots, \alpha N$, and set threshold values at the products of these coefficients and the reference value P, i.e., P·$\alpha 1$, P·$\alpha 2$, P·$\alpha 3$, ..., P·$\alpha N$. In this case, the reliability can be flexibly determined according to the interference level, and consequently, the demodulation error correction ability can be further improved. In any cases, it is possible to obtain a threshold value that varies with changes in the channel characteristics but hardly changes the level so greatly even when it is subjected to frequency selective interference.

The comparator unit 92 performs a comparison between the interference level that is detected by the interference detection unit 8 and the threshold value that is set by the threshold value setting unit 91 for each carrier, to determine the degree of the interference level with relative to the threshold value. At this time, for example when one threshold value is set, the comparator unit judges whether the interference level exceeds the threshold value or not. When there are plural threshold values, the comparator unit judges the interference level is located between which two threshold values.

The reliability level determination unit 93 determines the reliability level of each carrier on the basis of the result obtained by the comparator unit 92, and outputs the determined level to the error correction unit 6. For example when one threshold value is employed in the comparator unit 92, the reliability level can be represented by whether there is interference or not, i.e., by a binary value. When there are plural threshold values, the reliability level may be represented by a multi-level value more than two levels, whereby flexible reliability level calculation can be performed in accordance with the interference level.

Figure 10B:
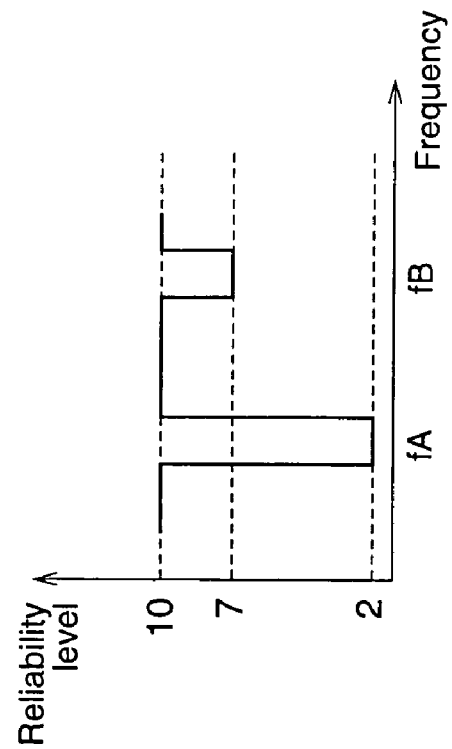
FIG. 10 are diagrams for explaining an operation of a reliability determination unit 9 that is provided according to the first embodiment.
Figure 10A:
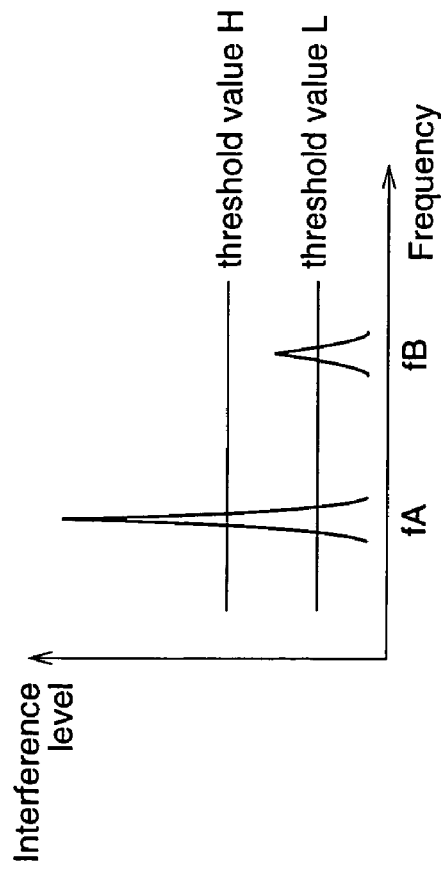

An example of the operation of the reliability determination unit 9 as mentioned above will be described with reference to FIGS. 10(*a*) and 10(*b*). Consideration is given to a case where there are two frequency selective interferences having different degrees of influences upon the received signal at positions fA and fB on the frequency axis, and it is assumed that the interference levels having different peaks are obtained in the proximity to the positions fA and fB by the interference detection unit 8, as shown in FIG. 10(*a*). It is further assumed that the threshold value setting unit 91 sets two threshold values "H" and "L" on the basis of the reference value. In this case, the comparator unit 92 performs a comparison between the interference level and the two threshold values "H" and "L". The comparator unit 92 judges that the interference level is higher than the threshold value "H" near the position fA, the interference level is located between the threshold values "L" and "H" near the position fB, and the interference level is lower than the threshold value "L" at the other positions on the frequency axis. It is assumed that the reliability level determination unit 93 represents the reliability level by three levels, i.e., "2", "7", "10" in ascending order of the reliability, and that the reliability level determination unit 93 judges carriers indicating the interference level that is higher than the threshold value "H" to be the least reliable and outputs the lowest reliability level "2", outputs the intermediate reliability level "7" for carriers indicating the interference level that is not higher than the threshold value "H" but higher than the threshold value "L", and judges the other carriers to be the most reliable and outputs the highest reliability level "10". Consequently, the reliability level determination unit 93 outputs the reliability level as shown in FIG. 10(*b*), and the reliability level of the carriers near the position fA is "2", the reliability level of the carriers near the position fB is "7", and the reliability level of the other carriers is "10". Then, the error correction unit 6 performs error correction on the basis of the reliability level, whereby even when co-channel interference occurs, deterioration of the demodulation error performance caused by the interference can be suppressed, and accordingly the demodulation error correction performance can be improved.

Next, the error correction unit 6 will be described. The error correction unit 6 includes a soft decision unit 61, a soft decision transformation unit 62, and an error correction decoding unit 63, as shown in FIG. 1. The error correction unit 6 performs a correction processing by soft decision decoding using the above-mentioned reliability level. The soft decision decoding is a method for converting a demodulation signal into a soft decision information signal corresponding to an original information signal that has been employed at the modulation, then representing the certainty of a received signal using a distance between the soft decision information signal and the original information signal (which is known in the receiver) or the like, and accumulating the certainty to estimate the sequence of the information signal.

Figure 11:
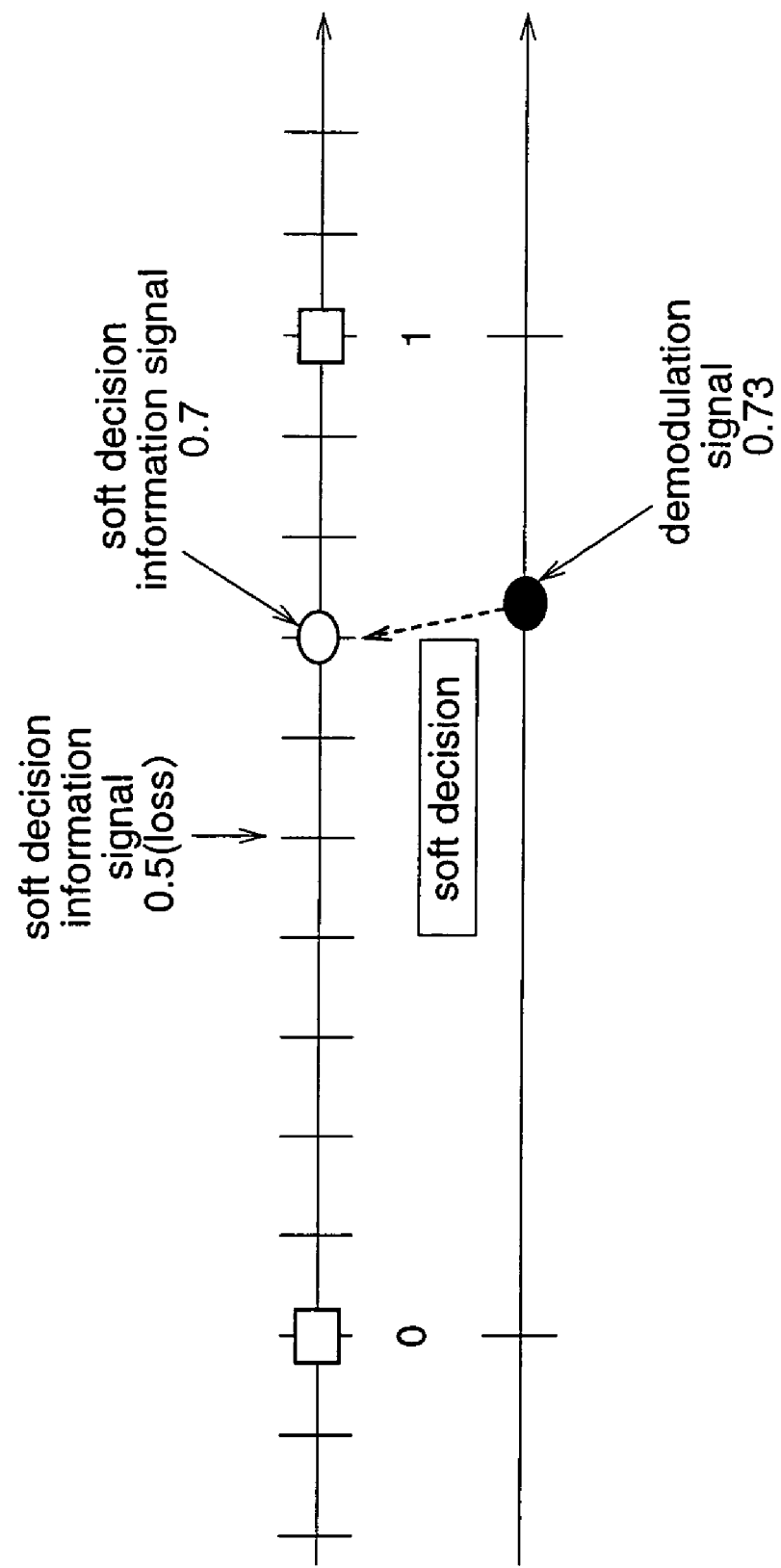
FIG. 11 is a diagram showing a concept of a soft decision decoding method.

An example of the soft decision decoding method is shown in FIG. 11. Soft decision information signals at several levels are at and around the midpoint between the original information signals "0" and "1", and an inputted demodulation signal is converted into the closest signal selected from among the soft decision information signals including "0" and "1". It can be said that when the soft decision information signal that is closer to the original information signal "0" or "1" is decoded, the decoded information signal has a higher reliability. On the other hand, it can be said that when the soft decision information signal that is closer to the midpoint between the original information signal "0" and "1" is decoded, the decoded information signal has a lower reliability. The soft decision information signal having the lowest reliability is lost and converted into "0.5".

In the error correction unit 6 according to the first embodiment, the soft decision unit 61 converts the demodulation signal obtained by the demodulation unit 5 into a soft decision information signal in the above-mentioned manner. The soft decision transformation unit 62 transforms the soft decision information signal that has been obtained by the soft decision unit 61 using the reliability level determined by the reliability determination unit 9. To be more specific, the correction unit 62 lowers the reliability of the soft decision information signal according to the reliability level. That is, the signal is corrected to a soft decision information signal that is closer to the midpoint between the original information signal "0" and "1". Thereafter, the error correction decoding unit 63 subjects the corrected soft decision information signal to error correction decoding.

The above-mentioned multi-carrier receiver according to the first embodiment sets the threshold value for judging the interference level, on the basis of a signal that is hardly affected by frequency selective interference and varies with changes in the channel characteristics. Therefore, the threshold value adaptively varies with changes in the channel characteristics, whereby an appropriate determination according to the level of the frequency selective interference can be performed.

Figure 12:
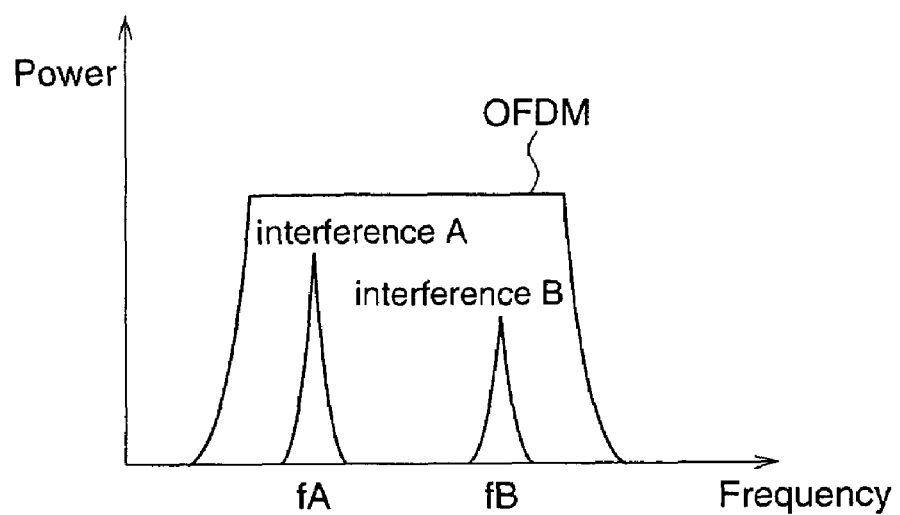
FIG. 12 is a diagram showing a receipt signal that has been subjected to frequency selective interference.

Processing in a case where the multi-carrier receiver according to the first embodiment receives an OFDM signal upon which two kinds of frequency selective interference are superimposed as shown in FIG. 12 will be described with reference to FIGS. 13(*a*) and 13(*b*). It is assumed that these two kinds of frequency selective interferences A and B caused by different factors are located near positions fA and fB on the frequency axis, respectively.

Figure 13A:
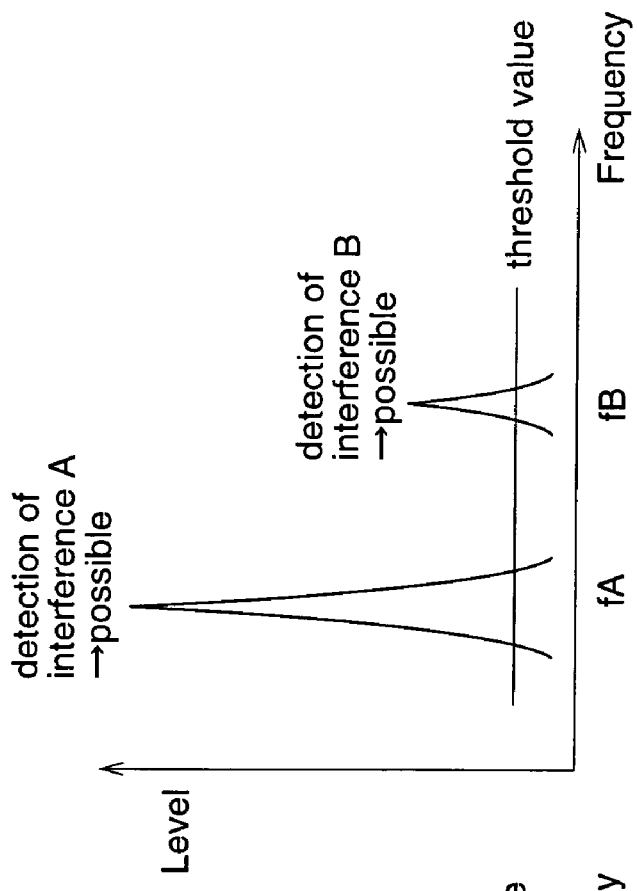
FIG. 13 are diagrams showing the relationship between the interference level that is obtained by an interference detection unit 8 according to the first embodiment, and the threshold value to be used in a reliability determination unit 9.
Figure 13B:
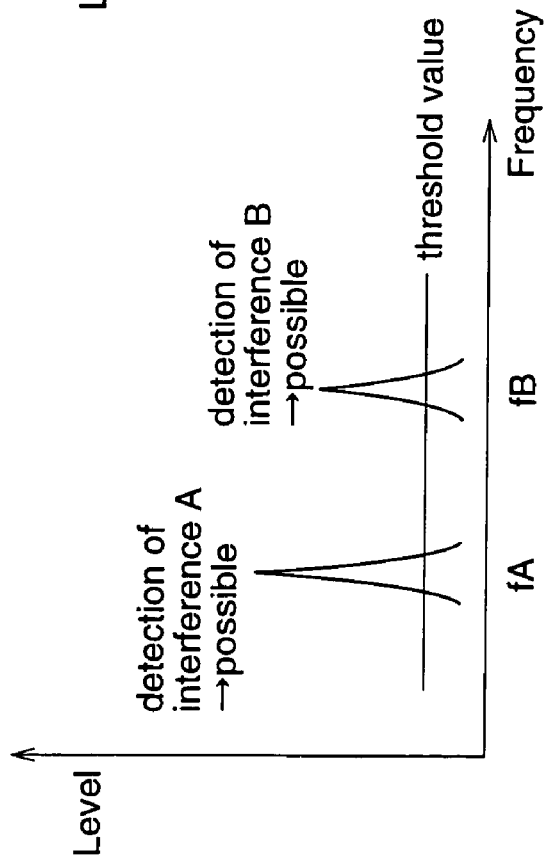

FIGS. 13(*a*) and 13(*b*) show the relationship between the interference level detected by the interference detection unit 8 and the threshold value that is employed in the reliability determination unit 9 (one threshold value is employed).

FIG. 13(*a*) shows a case where the interference A and the interference B do not have such a large difference in influences upon the OFDM signal. In this case, FIG. 13(*a*) indicates that there are some differences between the output level of the interference detection unit 8 and the threshold value near the positions fA and fB on the frequency axis, respectively. Therefore, the comparator unit 92 easily detects both of the interferences A and B, and can appropriately obtain the reliability level corresponding to the respective interferences, respectively.

On the other hand, FIG. 13(*b*) shows a case where the influence of the interference A upon the OFDM signal is significantly larger than the influence of the interference B upon the OFDM signal. FIG. 13(*b*) indicates that, also in this case, there are some differences between the output level of the interference detection unit 8 and the threshold value near the positions fA and fB on the frequency axis, respectively. Therefore, the comparator unit 92 easily detects both of the interferences A and B, and can appropriately obtain the reliability level corresponding to the respective interferences.

This is because, in order to determine the interference level, not the comparison between the interference level and a value that changes adaptively to the interference level, i.e., an average value of the interference levels for all carriers like in the prior art, but the comparison between the interference level and a reference value that hardly changes the level even when it is subjected to frequency selective interference, i.e., a threshold value that is obtained from an average power of the channel characteristics for all carriers is performed.

Figure 14:
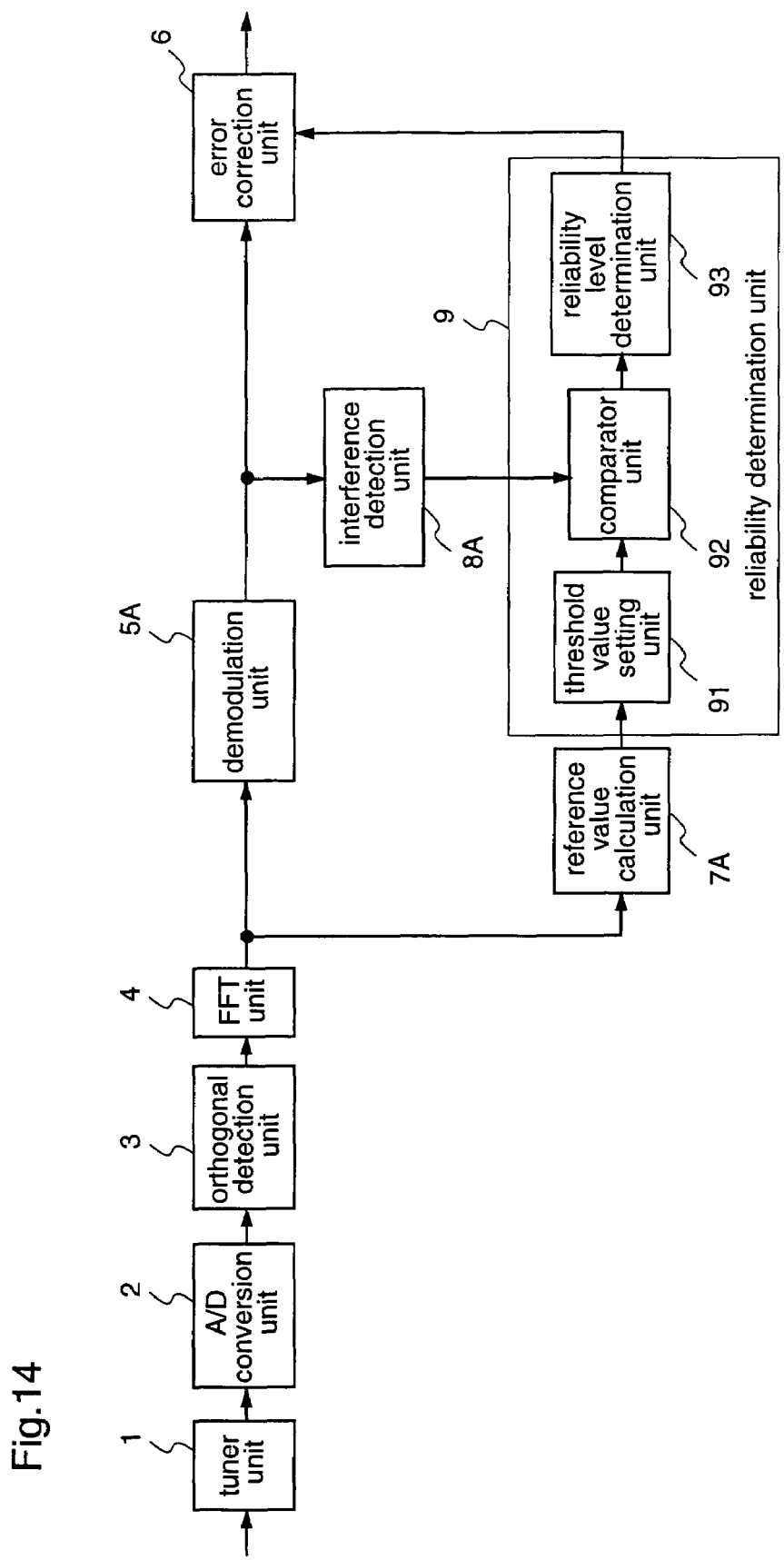
FIG. 14 is a diagram showing a construction that is different from the construction according to the first embodiment.

Here, the respective operations of the demodulation unit 5, the reference value calculation unit 7, and the interference detection unit 8 according to the first embodiment are not restricted to those as described above. An example of other operations will be shown in FIG. 14. In FIG. 14, components that execute the same operations in FIG. 1 are denoted by the same reference numerals as those in FIG. 1.

A demodulation unit 5A of FIG. 14 can perform any operation so long as the demodulation unit 5A subjects a received signal to synchronous detection or differential detection, thereby to output a demodulation signal.

Figure 15:
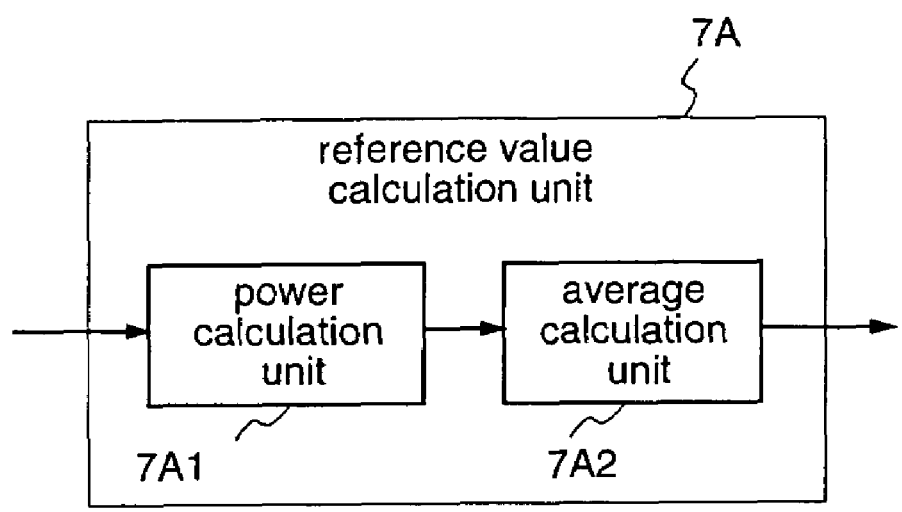
FIG. 15 is a diagram showing an internal construction of a reference value calculation unit shown in FIG. 14.

A reference value calculation unit 7A may perform any internal operation so long as it can calculate, from a received signal, a signal that hardly changes the level even when it is subjected to frequency selective interference, but has a property varying with changes in the channel characteristics. For example, like the reference value calculation 7A as shown in FIG. 14, it can receive pre-demodulation carriers, and obtains an average value of power of all the pre-demodulation carriers as a reference value by a power calculation unit 7A1 and an average calculation unit 7A2 as shown in FIG. 15.

Further, even when the reference value is calculated on the basis of the channel characteristics of the pilot signal as mentioned above, it is possible that the average power is obtained from signals that have been subjected only to time-based interpolation without subjected to frequency-based interpolation, to be employed as a reference value, or the average power is obtained from signals that have been subjected only to frequency-based interpolation without subjected to time-based interpolation, to be employed as a reference value.

Further, the reference value may be obtained from any signal, such as a signal that is obtained after demodulation in the course of the demodulation process, or in the course of the interference detection process.

The interference detection unit may perform any internal processing so long as it can detect carriers that are subjected to frequency selective interference, and interference levels. For example, as shown in FIG. 14, an interference detection unit 8A can receive an output from the demodulation unit 5A, and internally obtain distribution of constellation for each carrier to judge carriers that are subjected to frequency selective interference. The carriers can be obtained from any signal, such as a signal that is obtained before the demodulation, in the course of the demodulation, or in the course of the reference value calculation.

The demodulation and the reference value calculation according to the first embodiment include common processes, i.e., processing for interpolating the channel characteristics of pilot signals to obtain the channel characteristics of all carriers is commonly performed at the demodulation and the reference value calculation. Therefore, the demodulation unit 5 and the reference value calculation unit 7 have several common components as shown in FIG. 1.

However, depending on the respective processings at the demodulation and reference value calculation, different components from those in the first embodiment may be commonly used by the demodulation unit 5 and the reference value calculation unit 7. For example, when the complex division unit 56 in FIG. 1 performs division of a complex signal by using the sum of squares of the outputs from the frequency-based interpolation unit 55, i.e., the power, this square sum may be inputted to the average calculation unit 72. In this case, the power calculation unit 71 is eliminated.

When the demodulation unit and the reference value calculation unit perform different processing, these units can be constituted by separate and independent components.

As described above, according to the first embodiment, when a signal that has been subjected to plural frequency selective interferences having different degrees of influences is received, a reference value that is hardly affected by the frequency selective interference is obtained, and the comparison between the obtained reference value and the detected interference is performed, thereby to determine the reliability for each carrier. Therefore, it is possible to avoid undetection of interference having a smaller degree of influence because of the existence of interference having a relatively larger degree of influence. Further, even when there are variations of the channel characteristics due to fading or the like, a reference value is adaptively obtained, whereby the reliability level can be appropriately calculated also in a receiving environment where the channel characteristics vary. Consequently, the error correction based on the appropriate reliability level can be performed for carriers that are subjected to the frequency selective interference, thereby preventing the deterioration in the demodulation error correction performance.

In this first embodiment, the description has been given of the application where the receiver receives an OFDM signal, while the receiver may receive other signals. This embodiment may apply for other apparatus that receives a FDM signal that is obtained by frequency division multiplexing with plural carriers when the apparatus is constituted by required components depending on the received signal. In this case, components such as the FFT unit 4 are eliminated.

Embodiment 2

A second embodiment corresponds to inventions as described in the second to sixth, twelfth, and eighteenth aspects discussed above. When detected frequency selective interference includes a so-called floor, i.e., a bottom part of frequency characteristics, a receiver according to the second embodiment removes the floor and then detects the frequency selective interference, thereby avoiding malfunction resulting from the floor.

The receiver according to the second embodiment will be described. As in the first embodiment, the description will be given of a case where a multi-carrier receiver according to the second embodiment is employed as a receiver that receives an OFDM transmission signal.

Figure 16:
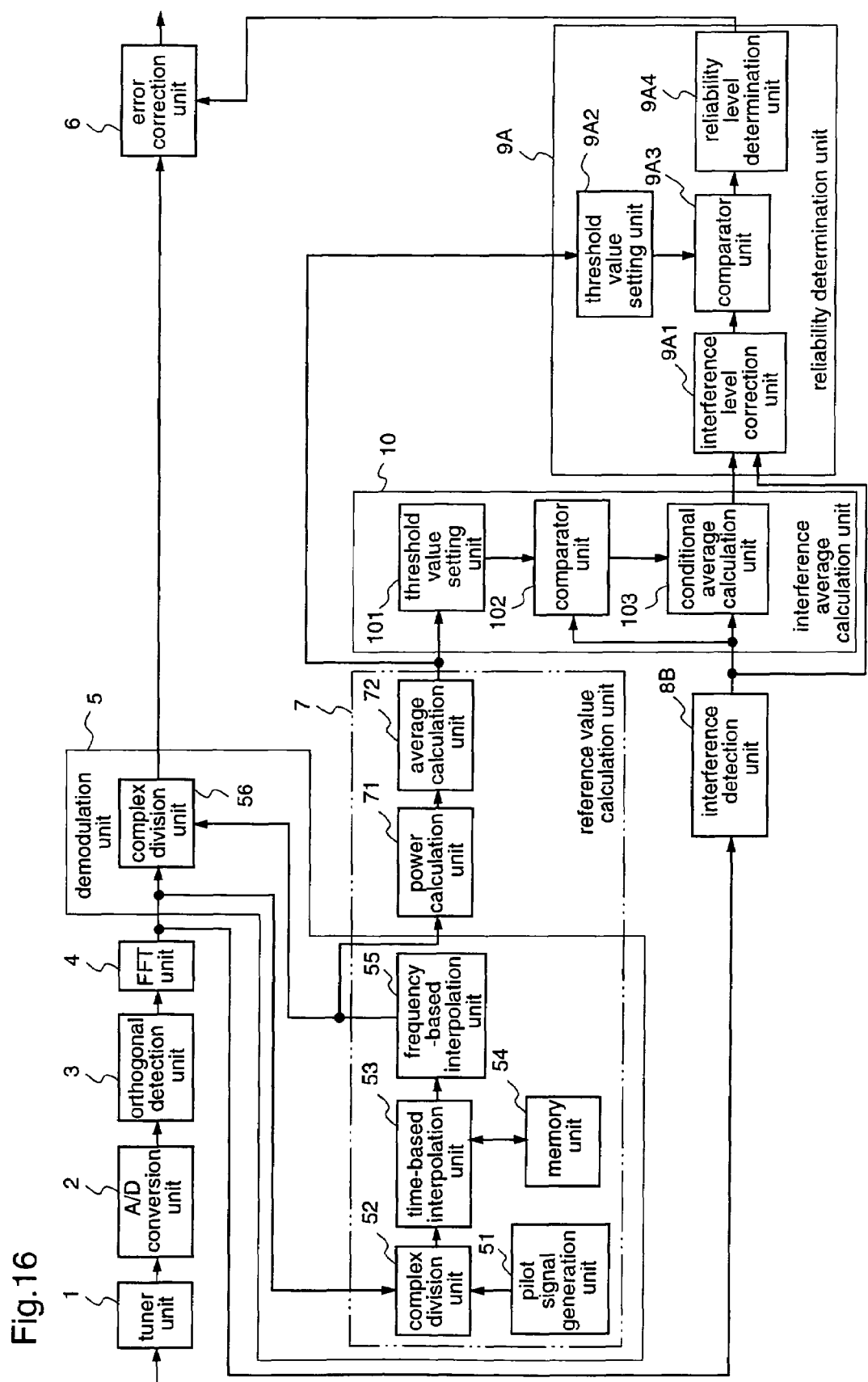
FIG. 16 is a diagram showing an entire construction of a multi-carrier receiver according to a second embodiment of the present invention.

FIG. 16 is a diagram illustrating an entire construction of a multi-carrier receiver according to the second embodiment. Here, components that carry out the same processing as in the first embodiment are denoted by the same reference numerals as those in FIG. 1.

The second embodiment is different from the first embodiment in that an interference average calculation unit 10 is provided between the interference detection unit and the reliability determination unit, and that the internal processing of the reliability determination unit is different from that in the first embodiment. Further, the interference detection unit that is employed in the second embodiment may receive any signal and have any internal construction so long as it exhibits a peak of the interference level near a position that is subjected to frequency selective interference on the frequency axis. In this second embodiment, an interference detection unit 8B that receives a signal that has been subjected to FFT and calculates an interference level from the received signal is provided.

The signal obtained by the interference detection unit 8B has a peak at a position on the frequency axis, where the frequency selective interference occurs, while depending on the internal processing of the detection unit, a certain floor may be produced at the other positions due to interference other than the frequency selective interference, such as Gaussian noise interference.

The interference average calculation unit 10 estimates the floor from the interference level that is obtained by the interference detection unit 8B, and outputs the estimated floor as an interference average level to the reliability determination unit 9A.

The reliability determination unit 9A performs a comparison between the interference level detected by the interference detection unit 8B and the interference average level calculated by the interference average calculation unit 10, determines that carriers indicating interference levels that are higher than the interference average level are subjected to the frequency selective interference, further determines reliability levels of the carriers in stages on the basis of the reference value that is calculated by the reference value calculation unit 7, and outputs the reliability level to the error correction unit 6.

In the receiver according to the second embodiment, the reference value calculation unit 7, the interference detection unit 8B, and the interference average calculation unit 10 executes processing corresponding to second, third, and fourth steps of a receiving method as defined in the eighteenth aspect of the present invention discussed above, respectively, and the reliability determination unit 9A executes a fifth step thereof, and the error correction unit 6 executes a sixth step thereof, respectively.

The second embodiment will be described in more detail.

Figure 17:
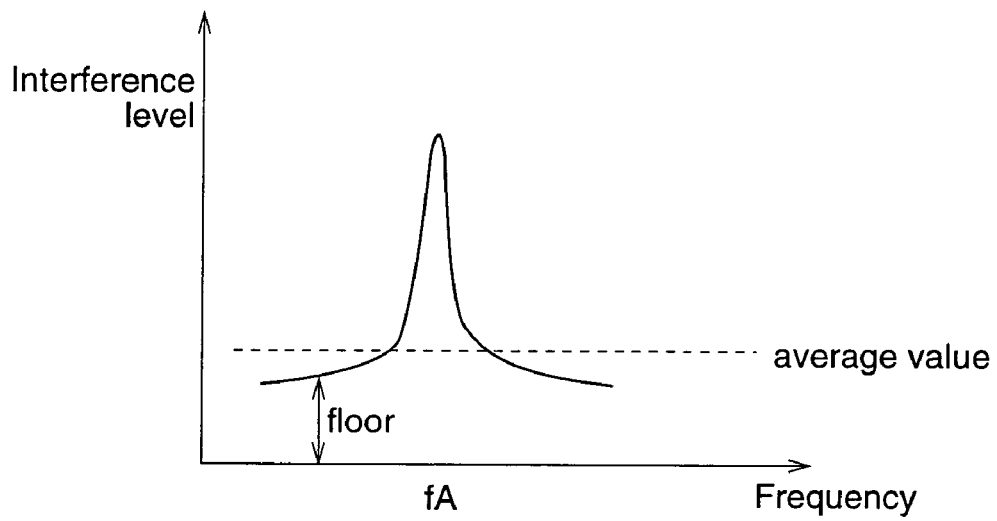
FIG. 17 is a diagram showing a floor of the interference level.

Consideration is given to a case where frequency selective interference included in a received signal is located at a position fA on the frequency axis. A certain processing of the interference detection unit 8 produces a peak of the interference level that is outputted from the unit 8 near the position fA as shown in FIG. 17. However, the interference level is not zero due to the Gaussian noises or the like at the other positions, and a so-called floor may be produced.

When the determination of the reliability level is performed directly to the interference level including the floor, the reliability level of carriers at the floor portion except for the vicinity of the position fA, which floor portion has been caused by other than the frequency selective interference may be excessively lowered, whereby the entire error rate may be deteriorated.

Thus, the interference average calculation unit 10 estimates the floor on the basis of the average value of the interference level, and outputs the estimated result to the reliability determination unit 9A as an interference average level. The reliability determination unit 9A determines the reliability level of carriers that indicate interference levels higher than the interference average level. Consequently, the reliability level can be appropriately measured with respect to the carriers which have been subjected to the frequency selective interference that is originally to be evaluated.

Figure 18:
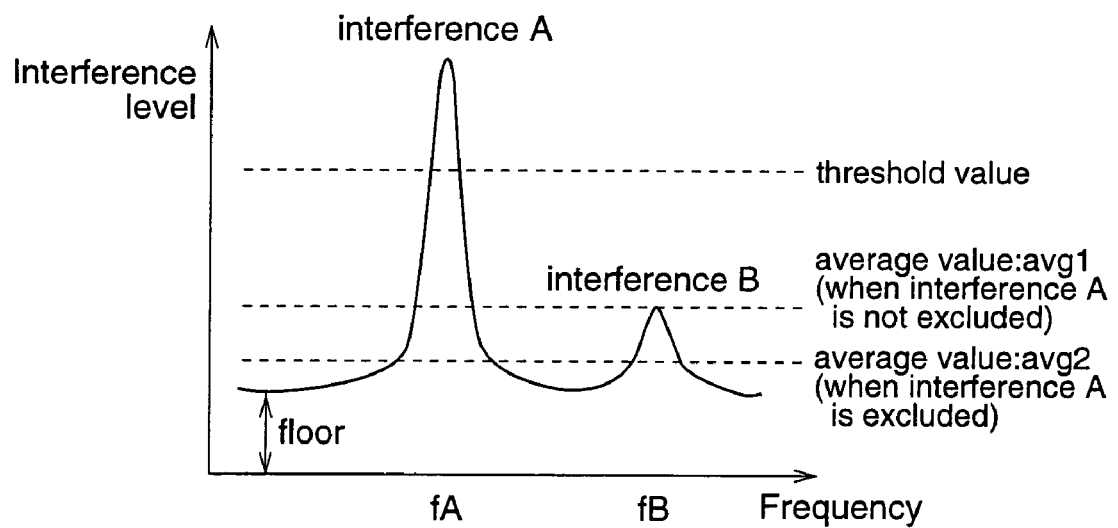
FIG. 18 is a diagram showing interference levels and an average value thereof.

Further consideration is given to a case where interferences A and B which are frequency selective interferences having different influences upon a received signal are simultaneously received, and these interferences exist near the positions fA and fB on the frequency axis, respectively. When an average value (avg1) of the interference levels is calculated over all carriers regardless of whether the interference levels are high or low as shown in FIG. 18, the average value avg1 over all carriers becomes larger in a form of being pulled by the interference a having a larger influence. When the reliability for carriers having the interference levels that are higher than the interference average level is determined by employing the obtained average value avg1 as an interference average level, the interference B having a relatively small influence that is as high as the average value avg1 fails to be detected, whereby the error rate is deteriorated.

Thus in this embodiment, the interference average calculation unit 10 estimates the floor on the basis of the average value of the interference level, by removing a signal having quite a high interference level from targets to be averaged, because carriers that have been subjected to frequency selective interference with large influence have quite high interference levels. For example, as shown in FIG. 18, a threshold value is prepared, and then carriers indicating interference levels which are higher than the threshold value are removed from the targets for average calculation. Thus, an average value (avg2) is obtained while the increase in the average value due to the relatively high interference level is suppressed, whereby appropriate estimation of the floor can be performed. Further, the reliability determination unit 9A can also calculate the reliability level of interference that has a relatively small influence appropriately from the interference level.

The interference average calculation unit 10 according to the second embodiment will be described in more detail. The interference average calculation unit 10 is, for example as shown in FIG. 16, constituted by a threshold value setting unit 101, a comparator unit 102, and a conditional average calculation unit 103.

The threshold value setting unit 101 can set a threshold value (first threshold value) on the basis of the reference value calculated by the reference value calculation unit 7. This threshold value and a threshold value (second threshold value) of the threshold value setting unit 9A2 in the reliability determination unit 9A may be both set empirically so that the error rate of the received signal has a minimum value while being compared with the interference level. For example, when the reference value calculated by the reference value calculation unit 7 is P, and a predetermined coefficient is α, the threshold value may be set at the product P·α. The reference value calculated by the reference value calculation unit 7 varies with changes in the channel characteristics but is hardly affected by the frequency selective interference, so that the threshold value setting unit 10 can obtain a threshold value that varies with changes in the channel characteristics but is hardly affected by the frequency selective interference. Here, the first threshold value may be a fixed value.

The comparator unit 102 performs a comparison (first comparison) between the interference level detected by the interference detection unit 8B and the threshold value obtained by the threshold value setting unit 101, and notifies the conditional average calculation unit 103 of the obtained result.

When calculating an average value of the interference levels obtained by the interference detection unit 8B, the conditional average calculation unit 103 removes the interference level that is higher than the threshold value from the targets for average calculation, on the basis of the comparison result outputted from the comparator unit 102, and takes the other interference levels as the targets for average calculation. At this time, the average value may be calculated by integrating the interference levels across the frequency domain and time domain. Consequently, even when there are carriers indicating significantly high interference levels, the floor of the interference level can be properly estimated regardless of the influences of such carriers. The calculation result of the conditional average calculation unit 103 is supplied to the reliability determination unit 9A as an interference average level. Here, when the interference average calculation unit 10 calculates the average value of the interference levels, it is also possible that the interference level that is higher than the threshold value is not removed from targets of average calculation but replaced with a predetermined typical value (corrected) to be employed for the calculation of the average value.

Further, the interference average calculation unit 10 does not have to employ one threshold value, but can use plural threshold values. Accordingly, the accuracy of the interference average level calculation can be changed according to the number of threshold values. When many threshold values are used, the interference average level can be calculated with higher precision, and carriers that have been subjected to frequency selective interference can be determined more accurately, thereby further improving the demodulation error correcting performance.

It is also possible that N pieces of predetermined coefficients $\beta 1, \beta 2, \beta 3, \ldots, \beta N$ (>1) are prepared, and the products of these coefficients and the reference value P, i.e., $P \cdot \beta 1$, $P \cdot \beta 2$, $P \cdot \beta 3$, $\ldots$, $P \cdot \beta N$ can be employed as the threshold values. Accordingly, the floor can be removed with reliability, thereby further improving the demodulation error correction ability.

Further, it is also possible that the interference level and the respective threshold values are compared with each other, and the interference level is replaced with predetermined typical values in stages (corrected) according to the value of the interference level, and the obtained typical value is employed for the calculation of the average value. Also in this case, the floor can be removed with reliability, whereby the demodulation error correction ability can be improved more.

It is also possible that the interference average calculation unit 10 performs a comparison (first comparison) between the interference level detected by the interference detection unit 8B and the threshold value obtained by the threshold value setting unit 101, selects interference levels to be averaged, on the basis of the comparison result, calculates the average value of the selected interference levels, and multiplies the average value of the interference level by a predetermined coefficient, thereby to raise the average value, and the raised average value is outputted as an interference average level.

As the above-mentioned interference average calculation unit 10 does not perform the processing with assuming that the position on the frequency axis of frequency selective interference such as co-channel interference of analog television signals or the magnitude there of is known, it can adaptively detect the position and magnitude of a prominent interference level regardless of the kind or position of the interference, and appropriately calculate the interference average level on the basis of the detected value.

Next, the reliability determination unit 9A according to the second embodiment will be described. The reliability determination unit 9A determines a carrier that has been subjected to frequency selective interference on the basis of the interference level and the interference average level, performs a third comparison between a differential level of the carrier that has been determined to be subjected to the frequency selective interference and a second threshold value, then determines the reliability of plural carriers in stages on the basis of the third comparison result, and outputs the determined reliability as a reliability level. The reliability determination unit 9A can be constituted by, for example as shown in FIG. 16, an interference level correction unit 9A1, a threshold value setting unit 9A2, a comparator unit 9A3, and a reliability level determination unit 9A4.

The interference level correction unit 9A1 performs a comparison (second comparison) by calculating a differential level between the interference level detected by the interference detection unit 8B and the interference average level calculated by the interference average calculation unit 10, determines a carrier indicating an interference level that is higher than the interference average level to be subjected to frequency selective interference, and outputs the inputted interference level as it is, while correcting the other carriers to a value indicating "no frequency selective interference", for example "0" as the interference level, and outputting the value to the comparator unit 9A3 as a corrected interference level.

Alternatively, the interference level correction unit 9A1 performs a comparison between the interference level detected by the interference detection unit 8B and the interference average level calculated by the interference average calculation unit 10, determines a carrier indicating an interference level that is higher than the interference average level to be subjected to frequency selective interference, and calculates a difference between the interference level and the interference average level, while correcting a carrier indicating an interference level that is not higher than the interference average level to a value indicating "no frequency selective interference", for example "0" as an interference level, and outputting the value to the comparator unit 9A3 as a corrected interference level.

The threshold value setting unit 9A2 sets a predetermined threshold value (second threshold value) on the basis of the reference value obtained by the reference value calculation unit 7, and outputs the threshold value to the comparator unit 9A3. For example, when assuming that the reference value calculated by the reference value calculation unit 7 is P and a predetermined coefficient is $\gamma$, the product $P \cdot \gamma$ may be employed as the threshold value. As the threshold value setting unit 9A2 sets the threshold value on the basis of the reference value calculated by the reference value calculation unit 7, the threshold value that varies with changes in the channel characteristics but is hardly affected by the frequency selective interference can be obtained. Here, one or plural threshold values can be employed. In the case of plural threshold values, the reliability can be more flexibly determined according to the interference level, thereby further improving the demodulation error correction ability. This is the same as in the first embodiment.

The comparator unit 9A3 performs a comparison (third comparison) between the corrected interference level obtained by the interference level correction unit 9A1 and the threshold value obtained by the threshold value setting unit 9A2 for each carrier, and outputs the comparison result relative to the threshold value to the reliability level determination unit 9A4. At this time, when one threshold value is employed, the comparator judges whether the corrected interference level obtained by the interference level correction unit 9A1 is higher than the threshold value or not, and outputs the result of the judgement. When plural threshold values are employed, the comparator unit judges the corrected interference level obtained by the interference level correction unit 9A1 is located between which two threshold values.

The reliability level determination unit 9A4 determines the reliability level of each carrier on the basis of the result obtained by the comparator unit 9A3, and outputs the determined reliability level to the error correction unit 6. For example, when one threshold value is employed in the comparator unit 9A3, the reliability level determination unit can represent the reliability level by a binary value, i.e., whether there is interference or not. When plural threshold values are employed, the reliability level can be represented by a multi-level value, for example having more than three levels, whereby flexible calculation of the reliability level can be performed according to the interference level, and the demodulation error correction ability can be further improved.

When determining the interference level, the above-mentioned reliability determination unit 9A employs a signal that is hardly affected by the frequency selective interference as a reference, like in the first embodiment. Therefore, an appropriate determination of the reliability level according to the interference level can be performed not only for a received signal including plural frequency selective interferences having different degrees of influences but also for interferences having relatively smaller influence. Further, as the reference signal that is employed at the determination of the interference level varies also with changes in the channel characteristics, the reliability level can be calculated appropriately also in a receiving environment where the channel characteristics may vary. Further, even when the detected interference level includes a floor, the comparison between the interference average level indicating the result of the floor estimation and the interference level is performed to calculate the reliability level of carriers including the frequency selective interference, with the influence of the floor being removed, whereby the deterioration of the error rate can be prevented.

Here, when the receiving environment in which variations in the channel characteristics are relatively slight is expected, the interference average calculation unit 10 can set the threshold value at a fixed value. Similarly, the reliability determination unit 9A sets the threshold value at a fixed value. Further, both of the interference average calculation unit 10 and the reliability determination unit 9A can set the threshold values at fixed values. It is also possible that only one of these units 10 and 9A sets the threshold value at a fixed value, and the other unit sets the threshold value on the basis of the reference value calculated by the reference value calculation unit 7. When both of the threshold values that are employed at the interference average calculation unit 10 and the reliability determination unit 9A are set at fixed values, the components which are utilized only to calculate the reference value in the reference value calculation unit 7 (the power calculation unit 71 and the average calculation unit 72 in FIG. 16) are of course eliminated.

Figure 19:
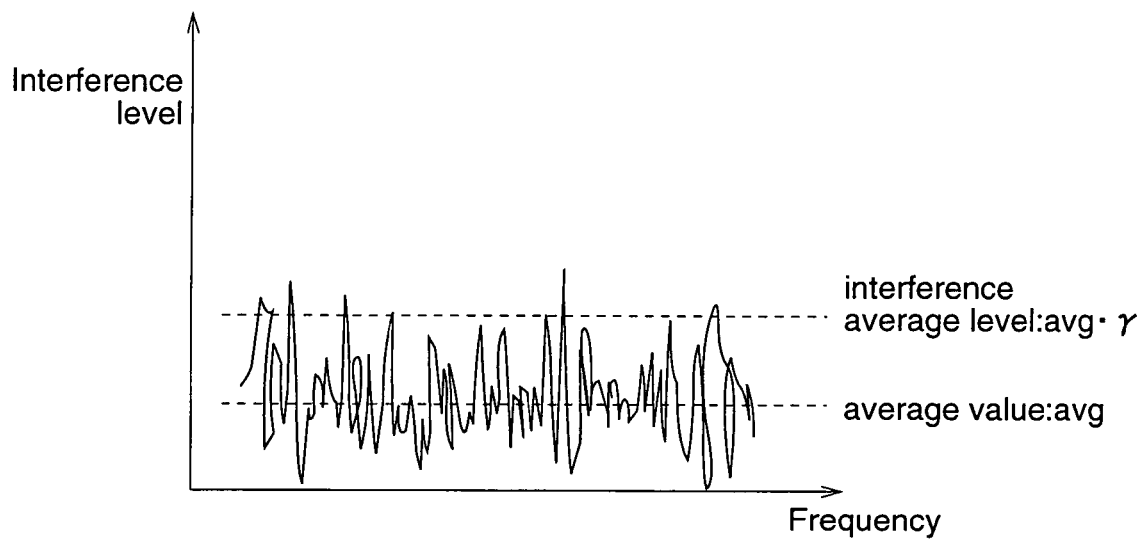
FIG. 19 is a diagram showing interference levels that are affected by Gaussian noises.

Here, when the Gaussian noises that are produced on the transmission line become large and the C/N ratio of the received signal is deteriorated, a certain interference detection method may cause deviations between the interference level detected by the interference detection unit 8B and the interference average level (avg) calculated by the interference average calculation unit 10, as shown in FIG. 19.

In such cases, when the average value of interference levels itself is employed as an interference average level to determine the reliability of a carrier indicating an interference level that is higher than the interference average level, there is a possibility that the reliability of the carrier indicating the interference level that is higher than the interference average level becomes too low because of interference (other than frequency selective interference) such as Gaussian noises.

Figure 20:
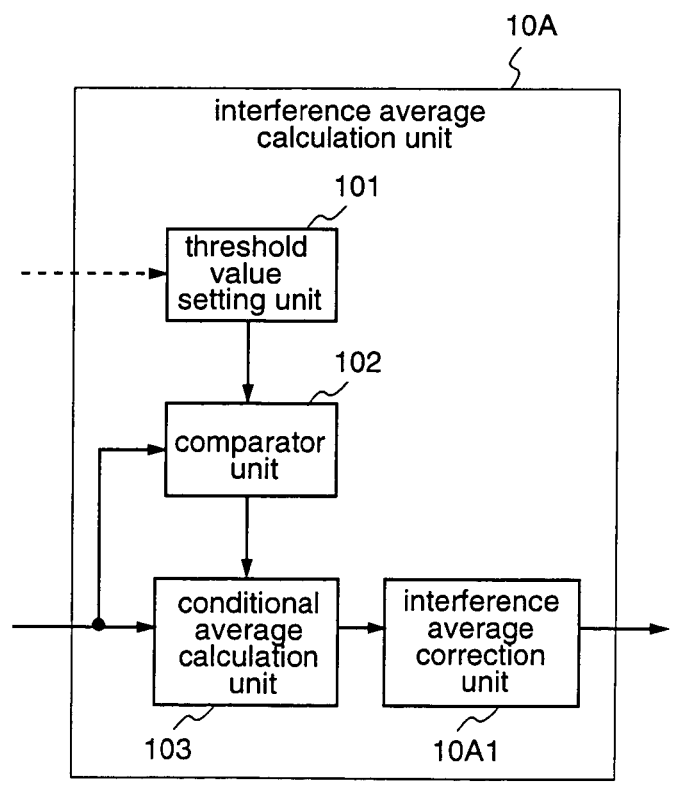
FIG. 20 is a diagram showing a construction of an interference average calculation unit according to the second embodiment.

Then, the interference average calculation unit 10A as shown in FIG. 20 may be employed in place of the interference average calculation unit 10. The interference average calculation unit 10A is obtained by adding an interference average correction unit 10A1 to the interference average calculation unit 10. Here, the reference value may be inputted to the threshold value setting unit 101, thereby to set a threshold value on the basis of the reference value. It is also possible to input a fixed value to the calculation unit 101 when a receiving environment where there are relatively slight variations in the channel characteristics is expected. By certain interference detection methods, the average value of the interference levels is proportional to the power of the Gaussian noises in many cases, and also the deviation between the interference level and the average value thereof is proportional to the power of the Gaussian noises in many cases. Thus, the interference average correction unit 10A1 may execute a correction by multiplying the output from the conditional average calculation unit 103 by a predetermined coefficient, for example $\gamma(\gamma \geq 1)$. Accordingly, the interference average level can be raised to a value that is higher than the pre-correction interference level, thereby to obtain an interference average level that cancels out the influences of the Gaussian noises. Consequently, it is possible to prevent the reliability of a carrier indicating the interference level that is higher than the interference average level, from becoming too low by a cause other than the frequency selective interference, such as the Gaussian noises.

As described above, according to the second embodiment, when a signal that is subjected to plural frequency selective interferences having different degrees of influences is received, a reference value that is hardly affected by the frequency selective interference is calculated, thereby determining the reliability of each carrier on the basis of the comparison between the calculated reference value and the detected interference, like the first embodiment. Therefore, it is possible to prevent the possibility that interference having a smaller influence is not detected due to existence of interference having a relatively larger influence.

Further, like in the first embodiment, even when there are variations in the channel characteristics such as fading, a reference value corresponding thereto is calculated to perform a comparison with the interference level, whereby appropriate calculation of the reliability level can be performed also in receiving environments where the channel characteristics vary.

Further, even when a floor is produced in the interference detection result by the influence of the Gaussian noises, the floor is estimated on the basis of the average value of the interference levels, to be employed as an interference average level, and a carrier indicating an interference level that is higher than the interference average level is judged that it includes frequency selective interference. Therefore, the reliability level can be determined only for carriers that are subjected to the frequency selective interference, with removing the influence of the floor, thereby preventing the deterioration in the error rate.

Further, when an average value of the interference detection result is obtained to estimate a floor, with respect to a carrier that is subjected to interference having quite a large influence, the level of the influence and the position thereof are adaptively detected and removed from targets for average calculation. Therefore, an appropriate estimation of the floor can be performed, whereby when a signal that has been subjected to plural frequency selective interferences having different degrees of influences is received, unfavorable undetection of interference having a relatively smaller influence can be prevented.

Further, according to the second embodiment, the processing is not performed with assuming that the position on the frequency axis or magnitude of frequency selective interference (such as co-channel interference in an analog television signal) is known. Thus, regardless of the kind or position of the interference, the position and magnitude of a prominent interference level is adaptively detected, and an interference average level can be calculated adaptively to the detected values.

Also in this second embodiment, like in the first embodiment, the construction or internal operations of the demodulation unit 5, the reference value calculation unit 7, the interference detection unit 8B, the interference average calculation unit 10, and the reliability determination unit 9A are not restricted to those as described above. These units can perform any operation, so long as they can output signals that are suitable for its purpose, as described in the first embodiment.

Further, in this second embodiment, the description has been given of the application in which an OFDM signal is received, while other kinds of signals can be also received. When the construction is changed according to the signal received, this apparatus can be also applied to other apparatuses that receive a FDM signal which is subjected to frequency division multiplexing with plural carriers. In this case, the FFT unit 4 and the like are eliminated.

Embodiment 3

A third embodiment corresponds to inventions as defined in the third, and thirteenth to fifteenth aspects of the present invention discussed above. When all carriers exhibit high interference levels by the influence of fading in cases where a multi-carrier receiver is mounted on a mobile unit and the like, correction is made so as to enhance the reliability level of the carriers, thereby removing the influences of fading.

The third embodiment of the present invention will be described. Like the second embodiment, the description is given of a case where a multi-carrier receiver according to the present invention is adopted as an apparatus for receiving an OFDM transmission signal.

Figure 21:
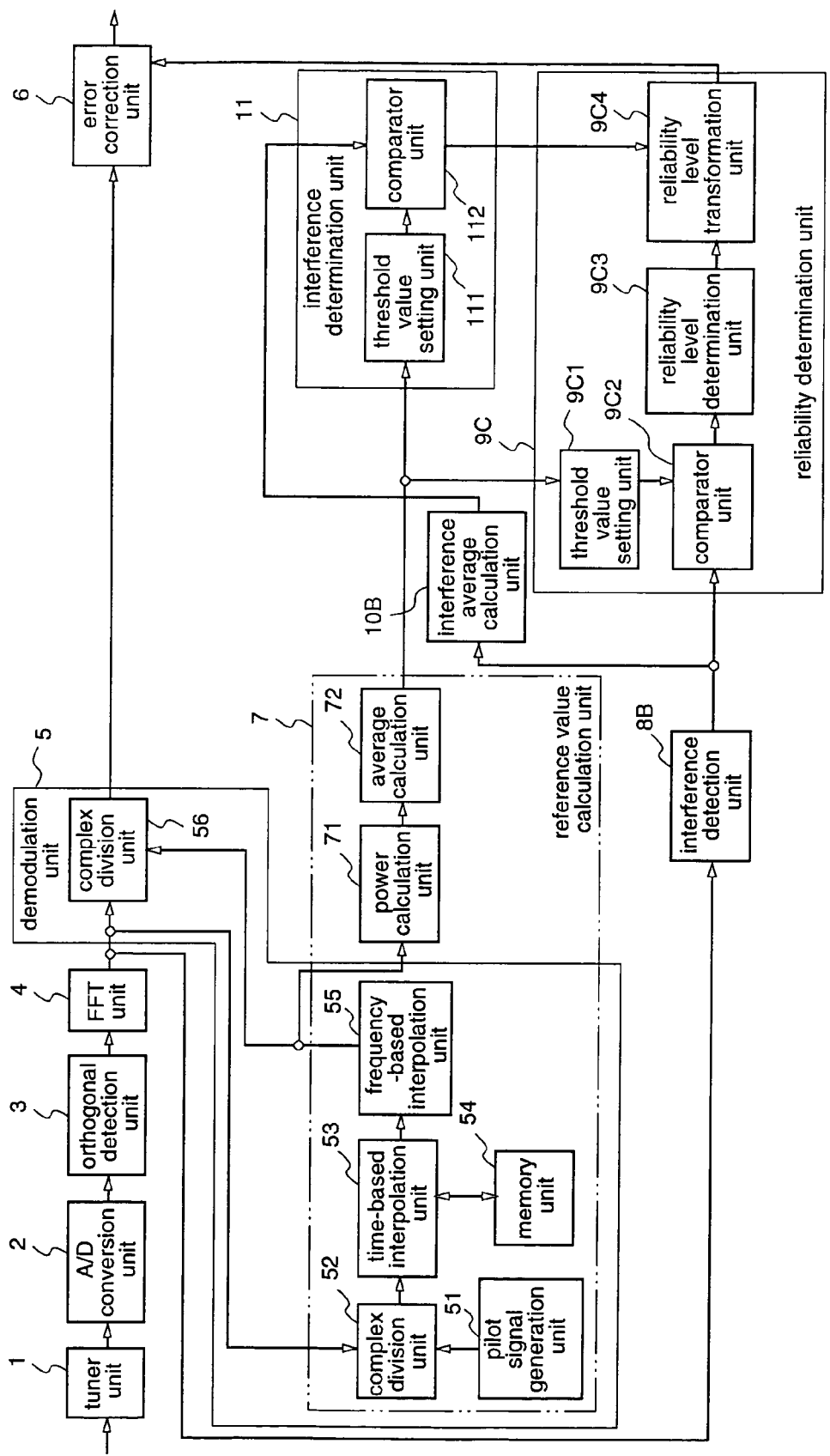
FIG. 21 is a diagram showing an entire construction of a multi-carrier receiver according to a third embodiment of the present invention.

FIG. 21 is a diagram illustrating an entire construction of a multi-carrier receiver according to the third embodiment. The components that execute the same processing as in the second embodiment are denoted by the same reference numerals as those in FIG. 7.

In the multi-carrier receiver according to the third embodiment, an interference determination unit 11 is provided between the interference average calculation unit 10B and the reliability determination unit 9C, and the reliability determination unit 9C executes a reliability level correction processing. Thus, the internal operation of the reliability determination unit 9C is different from that of the reliability determination unit 9A according to the second embodiment.

Further, so long as the interference average calculation unit 10B which is employed in the third embodiment calculates an average of interference levels which are detected by the interference detection unit, any signal can be inputted to the interference average calculation unit 10B, and the calculation unit 10B can have any internal construction. In this third embodiment, as the interference average calculation unit 10B, a unit for calculating an average value of interference levels that are detected by the interference detection unit 8B is provided.

The interference determination unit 11 determines the level of influences by frequency selective interference for a received signal in stages, on the basis of an average value of interference levels (interference average level), which is calculated by the interference average calculation unit 10B and the reference value that is calculated by the reference value calculation unit 7, and notifies the reliability determination unit 9C of the determined level as an interference determination level.

The reliability determination unit 9C determines the reliability level of each carrier on the basis of the interference level detected by the interference detection unit 8B and the reference value calculated by the reference value calculation unit 7, then corrects the reliability level on the basis of an interference determination level that is obtained by the interference determination unit 11, and outputs the corrected reliability level to the error correction unit 6.

In the receiver according to the third embodiment, the reference value calculation unit 7, the interference detection unit 8B, the interference average calculation unit 10B, and the interference determination unit 11 execute processing corresponding to second, third, fourth, and fifth steps in a receiving method as defined in the nineteenth aspect of the present invention, the reliability determination unit 9C executes a sixth step thereof, and the error correction unit 6 executes a seventh step thereof, respectively.

The third embodiment will be described in more detail.
Interference such as fading may occur in cases where the receiving state of the transmission line greatly varies, such as a time when receiving is performed while a mobile unit is moving at high speeds. In this case, the phase and amplitude of each carrier received greatly vary with time.

Figure 22:
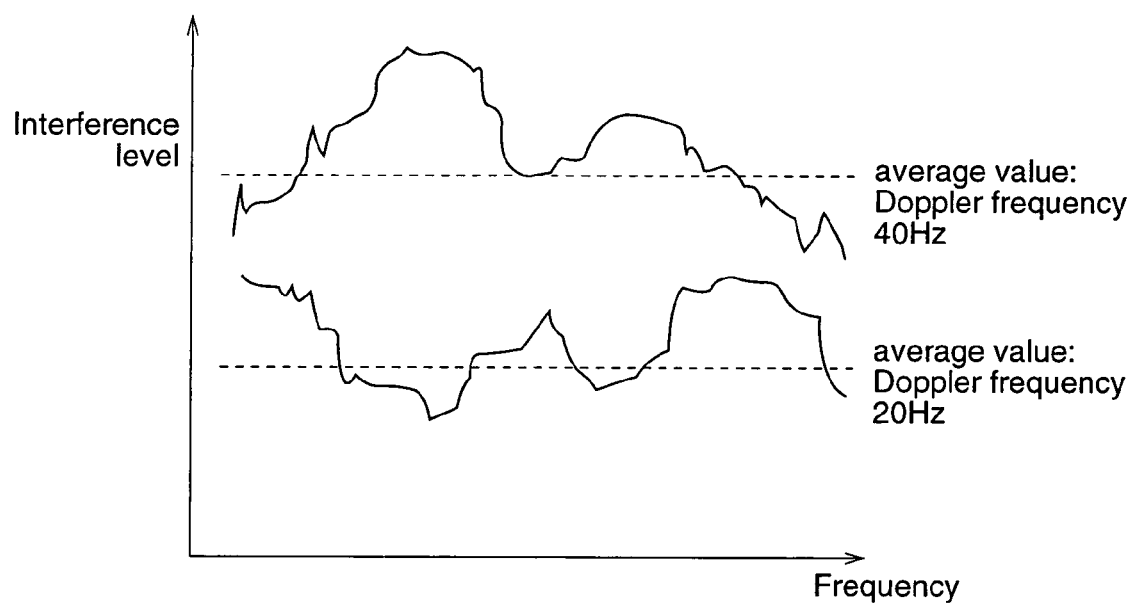
FIG. 22 is a diagram showing interference levels that are subjected to fading interference.

Doppler frequency is usually employed as an index that indicates the amount of variations in the received signal due to fading. As shown in FIG. 22, when the signal is subjected to fading interference, certain processing of the interference detection unit 8B may make the interference levels outputted from the interference detection unit 8B exhibit high values for almost all carriers within the band, and values of the interference level may become higher at the higher Doppler frequencies, and further their average value may be increased. This situation is greatly different from the case where the signal is subjected to the frequency selective interference that indicates a high peak only near a specific position on the frequency axis.

The receiver according to the third embodiment is characterized in that when the average value of interference levels for all carriers becomes excessively higher than a predetermined value due to fading interference or the like, which is not a target to be detected, a prescribed correction is performed to the calculated reliability level, thereby to prevent the reliability of all carriers from being too low. Accordingly, when the signal indicates high interference levels for all carriers, it is possible to avoid the situation that the reliability of all carriers becomes too low, whereby the entire error rate is greatly deteriorated. Further, as a reference for determining an average value of the interference levels, a signal that is hardly affected by the frequency selective interference and is adaptively changed with variations in the channel characteristics such as fading is employed, whereby the interference level can be appropriately determined also in the receiving environments where the channel characteristics vary.

To be more specific, in the third embodiment, the interference average calculation unit 10B calculates an interference average level, then the interference determination unit 11 performs a comparison between the interference average level and a threshold that is set on the basis of the reference value calculated by the reference value calculation unit 7 and outputs the result of the comparison to the reliability determination unit 9C as an interference determination level, and the reliability determination unit 9C executes a prescribed correction for the reliability level calculated on the basis of the interference determination level.

The interference determination unit 11 can be constituted by a threshold value setting unit 111, and a comparator unit 112, as shown in FIG. 21. The threshold value setting unit 111 sets a threshold value (third threshold value), taking a reference value calculated by the reference value calculation unit 7 as an interference detection reference value. This threshold value can be decided so as to avoid the situation that fading interference lowers the reliability of all carriers too much due to fading interference and accordingly the error rate is deteriorated. The threshold value can be set at the product P·δ that is obtained by multiplying a reference value P by a predetermined coefficient δ. Further, it is not necessary that one threshold value should be employed, but plural threshold values such as P·δ1, P·δ2, . . . , can be prepared with using predetermined coefficients δ1, δ2, . . . .

This threshold value can be previously set at a predetermined value, to eliminate the calculation processing. Accordingly, by providing many fixed threshold values with eliminating the processing for calculating the threshold values, the interference determination level can be accurately calculated, and thus the demodulation error correction ability can be improved also for fading interference. The interference determination reference value as the reference value can be previously set at a predetermined value.

The comparator unit 112 performs a comparison (fourth comparison) between the interference average level calculated by the interference average calculation unit 10B and the threshold value obtained by the threshold value setting unit 111, and notifies the reliability determination unit 9C of the comparison result. For example, when one threshold value is employed, the comparator unit 112 can determine the interference average level in two levels, i.e., whether the interference average level exceeds the threshold value or not. When plural threshold values are employed, the comparator unit determines the interference average level is located between which two threshold values, and outputs the obtained result to the reliability determination unit 9C as an interference determination level. When there are plural threshold values, the interference determination level can be represented by a multi-level value of, for example, three and more levels, whereby flexible calculation of the interference determination level can be performed according to the interference average level, and thus the demodulation error correction ability can be further improved also for fading interference.

The reliability determination unit 9C can be constituted by a threshold value setting unit 9C1, a comparator unit 9C2, a reliability level determination unit 9C3, and a reliability level transformation unit 9C4. Here, the threshold value setting unit 9C1, the comparator unit 9C2, and the reliability level determination unit 9C3 may have the same constructions as those of the threshold value setting unit 91, the comparator unit 92, and the reliability level determination unit 93 in the reliability determination unit 9 according to the first embodiment, respectively. By employing the threshold value setting unit 9C1, the comparator unit 9C2, and the reliability level determination unit 9C3, when a signal that is subjected to plural frequency selective interferences having different degrees of influences is received, a reference value that is hardly affected by the frequency selective interference can be calculated, and then the interference level of each carrier can be determined on the basis of a comparison (fifth comparison) between the detected interference and a threshold value (fourth threshold value) that is set on the basis of the calculated reference value. Therefore, undesired undetection of interference having a smaller influence due to the existence of interference having a relatively larger influence can be prevented. Further, even when there are variations in the channel characteristics such as fading, a reference value that is suitable for the variation can be calculated, whereby an appropriate determination can be performed also in receiving environments where there are variations in the channel characteristics.

In order to prevent the reliability of all carriers from being too low in the fading environments or the like, the reliability level transformation unit 9C4 executes transformation for the output from the reliability level determination unit 9C3 so as not to lower too much the reliability level that is outputted to the error correction unit 6 in accordance with the interference determination level that is determined by the interference determination unit 11. For example, when the comparator unit 112 outputs a signal indicating that the interference average level exceeds a predetermined threshold value due to fading interference or the like, the reliability level transformation unit raises the level indicating the reliability of the carrier, which is outputted from the reliability level determination unit 9C3, for example, by one level, thereby preventing a too low reliability level. The reliability level obtained after the level correction is outputted to the error correction unit 6.

Here, the reliability determination unit 9C executes a correction of the reliability level according to the interference determination level obtained by the interference determination unit 11, while the reliability determination unit may perform processing of executing a correction to raise a threshold value for the interference level determination according to the interference determination level obtained by the interference determination unit 11, so as not to lower too much the corrected reliability level.

As described above, according to the third embodiment, like in the first embodiment, when a signal that is subjected to plural frequency selective interferences having different degrees of influences is received, a reference value that is hardly affected by the frequency selective interferences is calculated, and the reliability of each carrier is determined on the basis of the comparison between the calculated reference value and the detected interference. Therefore, undetection of interference having a smaller influence due to the existence of interference having a relatively larger influence can be prevented.

Further, like in the first embodiment, even when variations in the channel characteristics such as fading occur, the reference value corresponding thereto is calculated and the comparison between the calculated reference value and the interference level is performed. Therefore, calculation of an appropriate reliability level can be performed even in the receiving environments where the channel characteristics vary.

Further, even when there is interference that is excluded from targets to be detected (which is different from frequency selective interference) such as fading interference, and interference levels for almost all carriers within the band become higher, the comparison between an average of the interference levels and a threshold value that is calculated on the basis of the reference value is performed, and then when it is found that the average value of the interference levels is excessively high, a prescribed correction is made to the reliability level that is calculated for each carrier. Therefore, it is possible to prevent the reliability level of all the carriers from being too low. Thus, the receiver according to the third embodiment is particularly effective in receiving environments where fading interference is expected, such as in a case where this receiver is mounted on a mobile unit to perform receiving or the like.

Also in the third embodiment, like in the second embodiment, the constructions and the internal operations of the demodulation unit 5, the reference value calculation unit 7, and the interference detection unit 8B are not restricted as those described above. These units may perform any internal operations so long as they can output signals that are suitable for their purposes, as described in the first embodiment.

Figure 23:
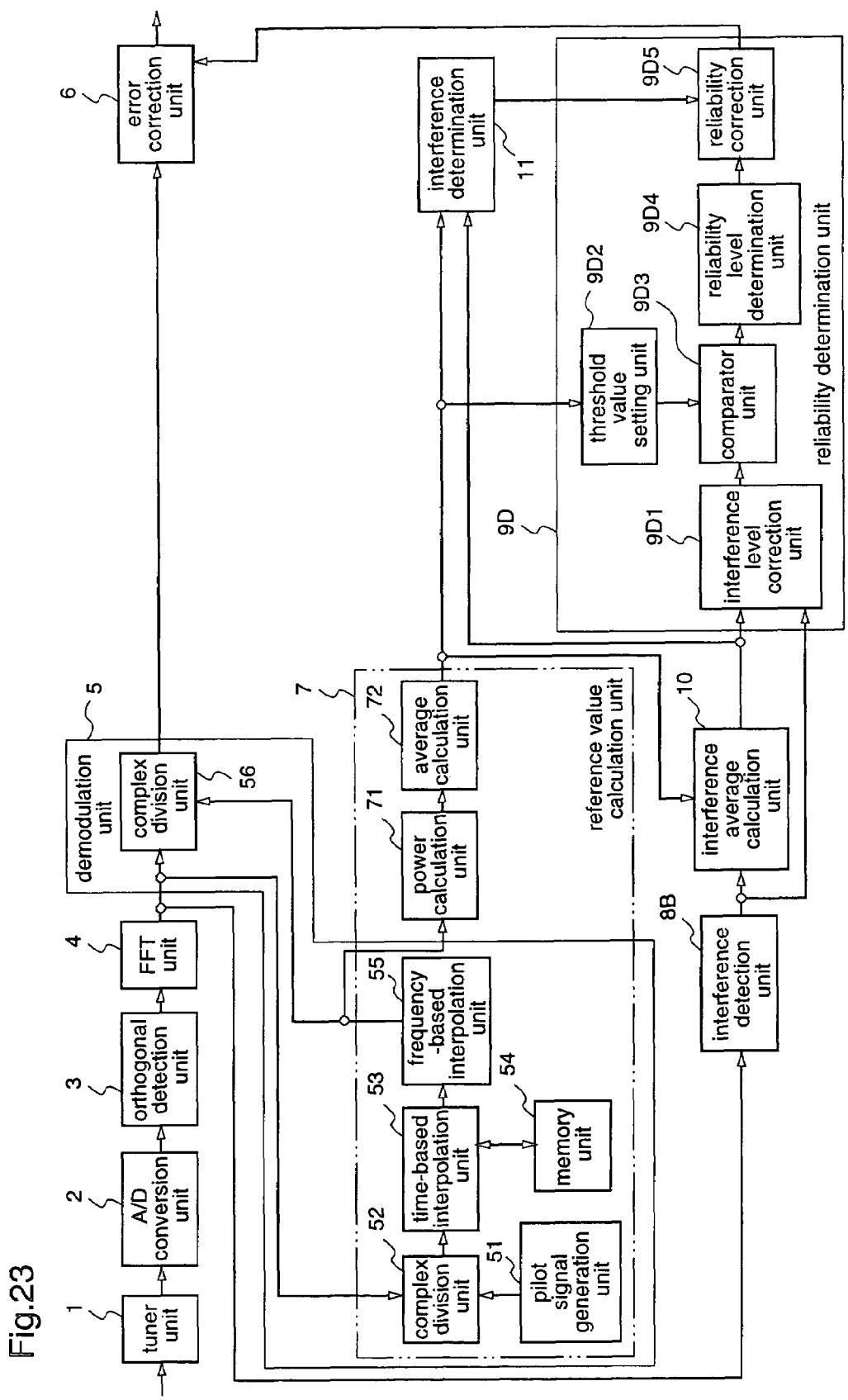
FIG. 23 is a diagram showing an entire construction of a multi-carrier receiver that is obtained by combining the second and third embodiments.
Figure 24:
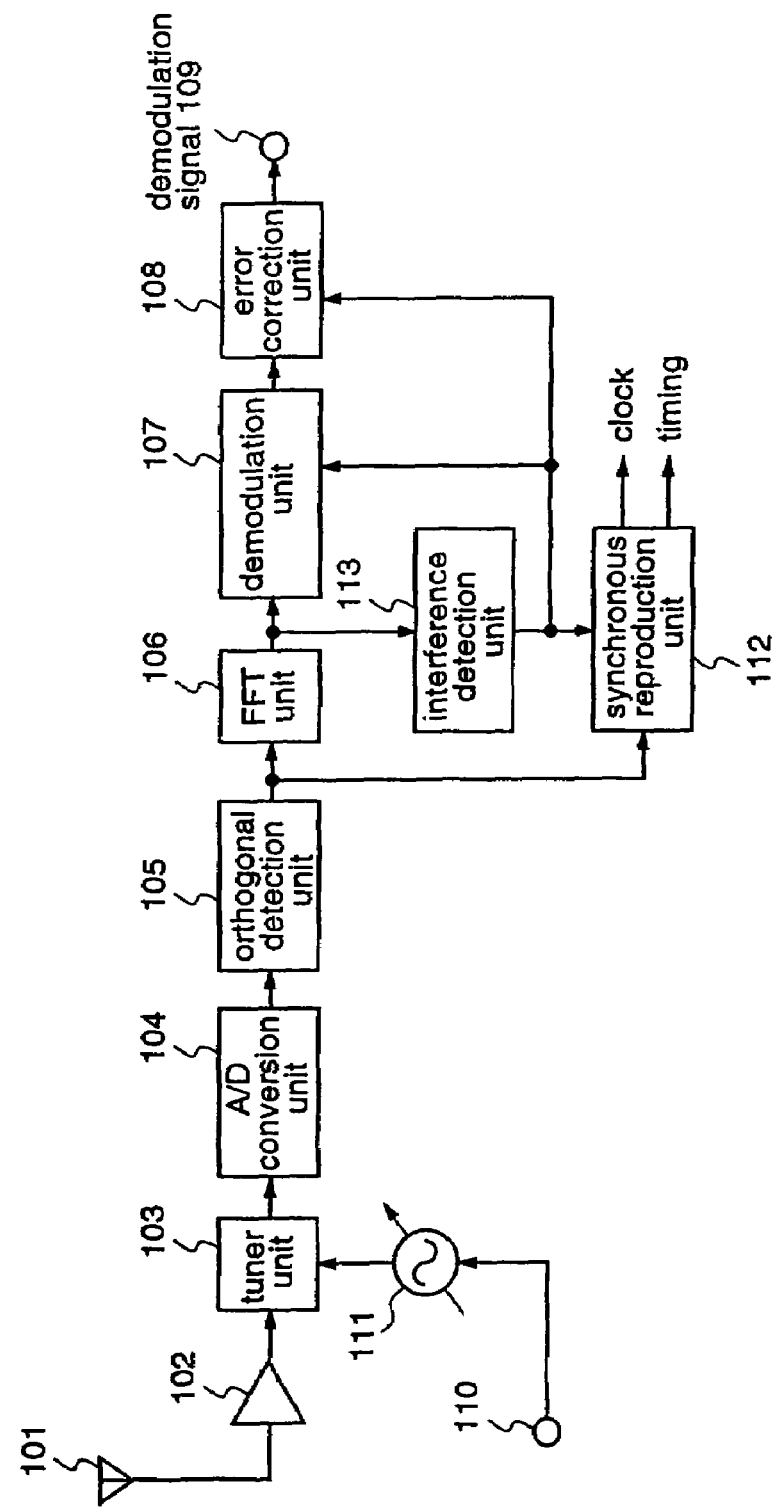
FIG. 24 is a diagram showing an entire construction of a prior art OFDM receiver.
Figure 25:
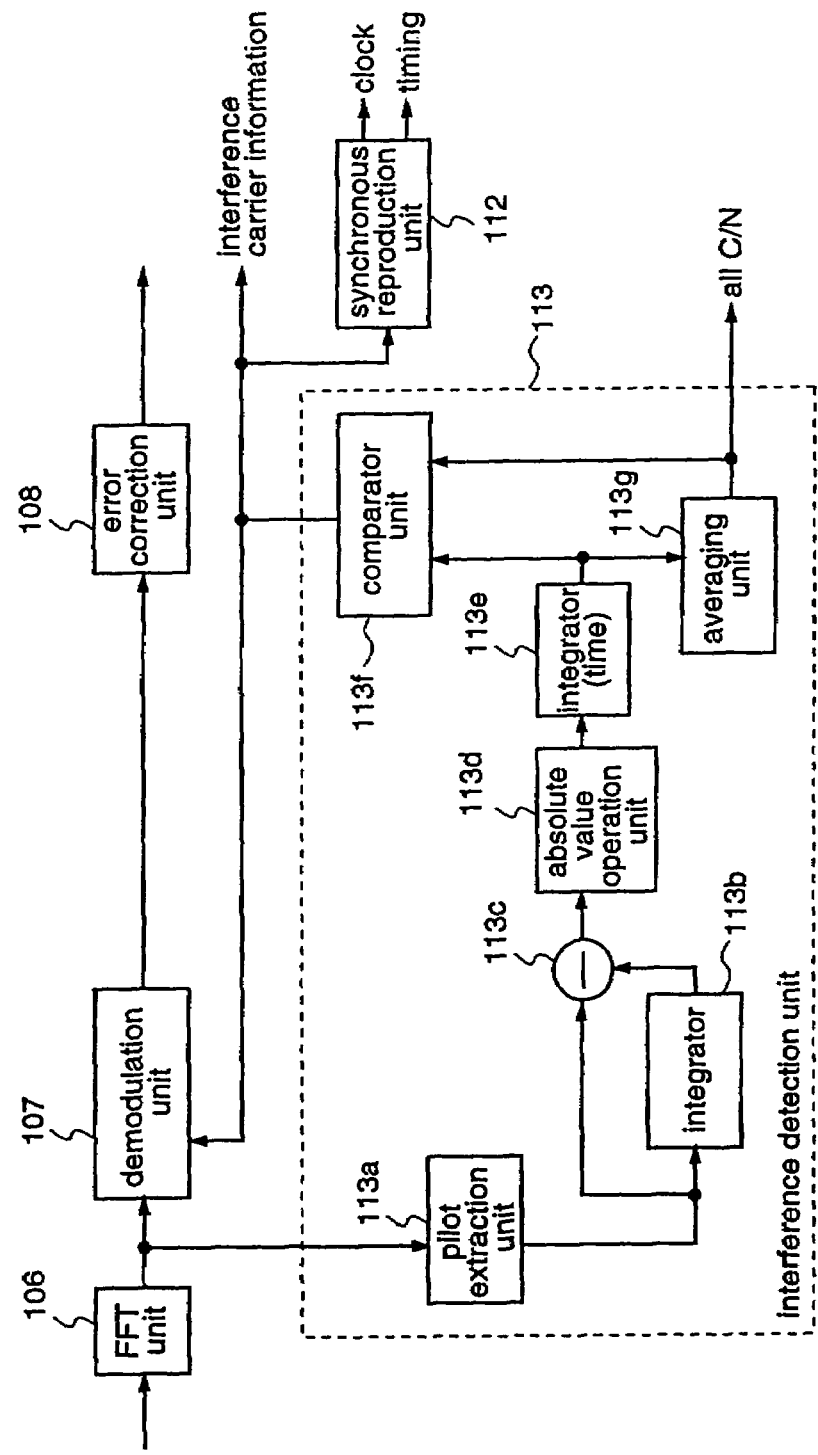
FIG. 25 is a diagram showing a construction of an interference detection unit that is provided in the prior art OFDM receiver.
Figure 26A:
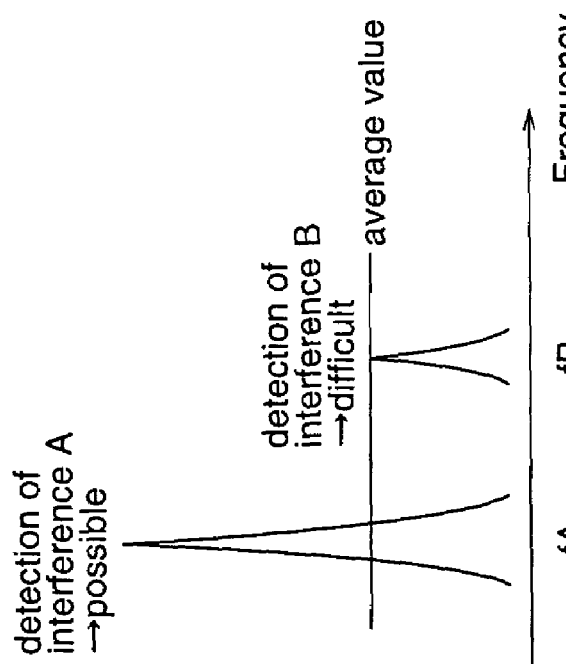
FIG. 26(a) is a diagram showing a case where a threshold value is set at a low value for interferences A and B having much difference in peak, so that these two interferences can be detected.
Figure 26B:
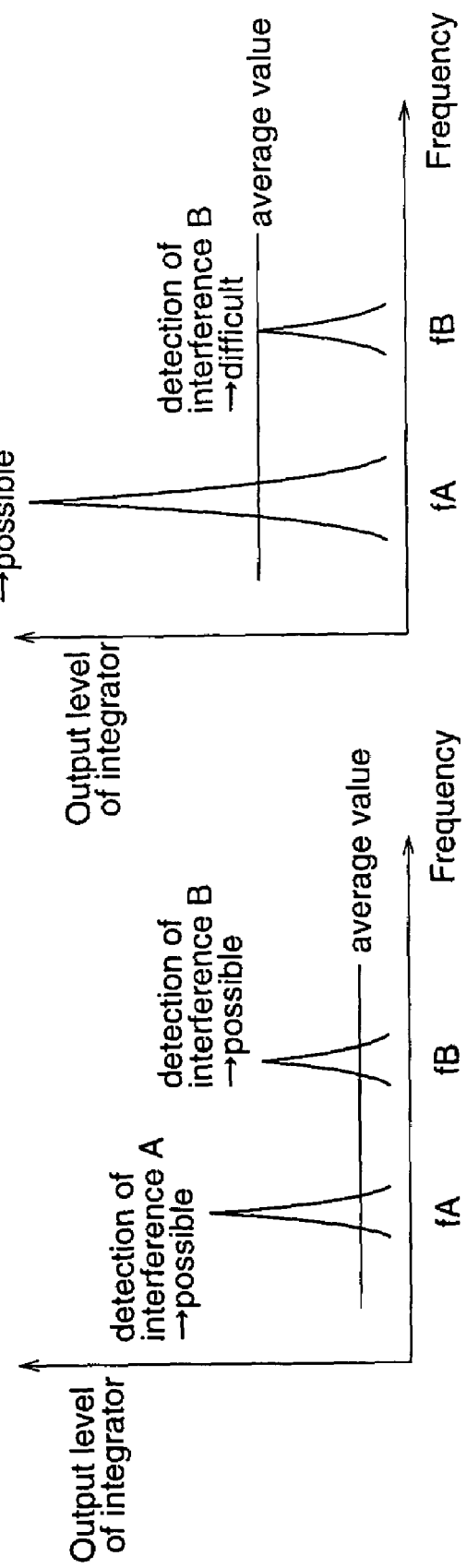
FIG. 26(b) is a diagram showing a case where a threshold value is set at a high value for interferences A and B having a large difference in peak, so that it is difficult to detect the interference B.

Further, a combination of the receivers according to the second and third embodiments can be also constituted. An example of the combination of the second and third embodiments is shown in FIG. 23. In FIG. 23, the same components as employed in FIGS. 16 and 23 are denoted by the same reference numerals. In this case, a reliability determination unit 9D with the combined internal operations of the reliability determination units in the second and third embodiments is provided.

The reliability determination unit 9D is constituted by an interference level correction unit 9D1, a threshold value setting unit 9D2, a comparator unit 9D3, a reliability level determination unit 9D4, and a reliability level transformation unit 9D5. The interference level correction unit 9D1 can be the same as the interference level correction unit 9A1 in the reliability determination unit 9A according to the second embodiment. The threshold value setting unit 9D2, the comparator unit 9D3, the reliability level determination unit 9D4, and the reliability level transformation unit 9D5 can be the same as the threshold value setting unit 9C1, the comparator unit 9C2, the reliability level determination unit 9C3, and the reliability level transformation unit 9C4 in the reliability determination unit 9C according to the third embodiment, respectively.

To be more specific, when an average value of interference detection results (interference levels) is obtained to calculate an interference average level, a comparison between the interference level and a predetermined reference value is performed, then for a carrier indicating a quite high interference level, the degree of influence and the position of the carrier are adaptively detected, then the detected carrier is removed from targets for average calculation, thereby to calculate the average value as an interference average level, and carriers indicating interference levels that are higher than the interference average level are determined in stages on the basis of the predetermined reference value to calculate the reliability level. Further, it is also possible that the interference average level is determined in stages on the basis of the predetermined reference value, and the reliability level is properly corrected on the basis of the determination result, to output the corrected reliability level to the error correction unit.

Consequently, in addition to the effect of the third embodiment, even when a floor is generated in the detected interferences by the Gaussian noises or the like, the floor is estimated from the average value of interference levels as an interference average level, and it is judged that frequency selective interference is included in a carrier indicating an interference level that is higher than the interference average level, whereby the influences of the floor can be eliminated, the reliability level of a carrier that is subjected to the frequency selective interference can be determined, and thus the deterioration of the error rate can be prevented. Further, when the average value of the detected interferences is obtained to estimate the floor, the degree of influence and position of a carrier that is subjected to interference having quite a larger influence are adaptively detected to remove the carrier from targets for average calculation, whereby the floor can be estimated appropriately, and when a signal that is subjected to plural frequency selective interferences having different degrees of influences is received, undetection of interference having a relatively smaller influence can be avoided.

By combining a plurality of the methods described in the above embodiments, a receiver that is effective for various receiving situations can be obtained.

In this third embodiment, the description has been given of the application of the receiver that receives an OFDM signal, while the receiver may receive other types of signals. By changing the construction of the receiver adaptively to a receipt signal, this embodiment can apply for other receivers that receive a FDM signal that is subjected to frequency division multiplexing with plural carriers. In this case, components such as the FFT unit 4 are not required.

INDUSTRIAL AVAILABILITY

This invention is suitable for suppressing deterioration of demodulation performance due to frequency selective interference such as spurious or co-channel interference when a FDM signal is received and, when the frequency selective interference includes a floor resulting from Gaussian noises, preventing a malfunction by removing influences of the floor and further, when a receiver is mounted on a mobile unit, suppressing a malfunction that is caused by misinterpretation of the influence of fading as that interference occurs across entire carriers.

The invention claimed is:

1. A receiver for receiving a frequency division multiplex (FDM) transmission signal which is produced by plural carrier signals generated at various frequencies within a transmission band being modulated with information signals which are assigned to the plural carrier signals, respectively, said receiver comprising:

a reference value calculation unit for estimating transmission characteristics based on the received FDM transmission signal, and calculating a reference value based on an average electric power of the transmission characteristics;

an interference detection unit for detecting the degree of influence by frequency selective interference, as an interference level, based on the received FDM transmission signal;

a reliability determination unit for determining a reliability level of the carrier signals that constitute the received FDM transmission signal based on the reference value and the interference level; and an error correction unit for performing error correction of the received FDM transmission signal based on the determined reliability level.

2. The receiver of claim 1, wherein said interference detection unit is operable to detect the degree of influence by frequency selective interference for the plural carrier signals in the received FDM signal, as interference levels, respectively, said receiver further comprising:

an interference average calculation unit for calculating an average of the interference levels detected by the interference detection unit, and said reliability determination unit determining a carrier signal that is subjected to the frequency selective interference, based on the average of the interference levels calculated by the interference average calculation unit and the interference levels, and determining the reliability level of the carrier signals that constitute the received FDM transmission signal based on the reference value.

3. The receiver of claim 1, wherein said interference detection unit is operable to detect the degree of influence by frequency selective interference for the plural carrier signals in the received FDM signal, as interference levels, respectively, said receiver further comprising:

an interference average calculation unit for calculating an average of the interference levels detected by the interference detection unit;

an interference determination unit for determining the degree of influence by the interference over the transmission band, based on the calculated average of the interference levels, and outputting the determined degree of influence as an interference determination level; and said reliability determination unit controlling the determined reliability level according to the output from the interference determination unit.

4. A receiver for receiving a frequency division multiplex (FDM) transmission signal which is produced by plural carrier signals generated at various frequencies within a transmission band being modulated with information signals which are assigned to the plural carrier signals, respectively, said receiver comprising:
- a reference value calculation unit for calculating an average electric power of the received FDM transmission signal, and outputting the calculated average electric power as a reference value;
- an interference detection unit for detecting the degree of influence by frequency selective interference, as an interference level, based on the received FDM transmission signal;
- a reliability determination unit for determining a reliability level of the carrier signals that constitute the received FDM transmission signal based on the reference value and the interference level; and
- an error correction unit for performing error correction on the received FDM transmission signal based on the determined reliability level.

5. The receiver of claim 4, wherein said interference detection unit detects the degree of influence for at least two of the plural carrier signals as respective interference levels, said receiver further comprising:
- an interference average calculation unit for calculating an average of the interference levels detected by the interference detection unit,
- wherein said reliability determination unit determines a carrier signal that is subjected to the frequency selective interference, based of the average level calculated by the interference average calculation unit and the interference levels, and determines the reliability level of the carrier signals that constitute the received FDM transmission signal based on the reference value.

6. The receiver of claim 4, wherein said interference detection unit detects the degree of influence for at least two of the plural carrier signals as respective interference levels, said receiver further comprising:
- an interference average calculation unit for calculating an average of the interference levels detected by the interference detection unit;
- an interference determination unit for determining the degree of influence by the interference over the transmission band, based on the calculated average of the interference levels, and outputting the determined level as an interference determination level;
- wherein said reliability determination unit controls the determined reliability level according to the output from the interference determination unit.

7. A receiver for receiving a frequency division multiplex (FDM) transmission signal which is produced by plural carrier signals generated at various frequencies within a transmission band being modulated with information signals which are assigned to the plural carrier signals, respectively, and pilot signals being inserted into the modulated carrier signals as references for detection of the carrier signals, said receiver comprising:
- a demodulation unit for demodulating the information signals from the received FDM transmission signal;
- a reference value calculation unit for calculating an average power of channel characteristics of the carrier signals based on the pilot signals that have been inserted into the received FDM transmission signal, and outputting the average power as a reference value;
- an interference detection unit for detecting the degree of influence by frequency selective interference for the plural carrier signals in the received FDM signal, as interference levels, respectively;
- an interference average calculation unit for setting one or plural first threshold values based on the reference value, performing a first comparison between the interference levels and the first threshold value, selecting at least two of the interference levels to be averaged, based on the first comparison result, and calculating an average of the selected interference levels to be outputted as an interference average level;
- a reliability determination unit for performing a second comparison between the interference levels and the interference average level, determining a carrier signal that has been subjected to frequency selective interference based on the second comparison result, setting one or plural second threshold values based on the reference value, performing a third comparison between an interference level of the carrier signal that has been subjected to the frequency selective interference and the second threshold value, determining reliability of the plural carrier signals based on the third comparison result, and outputting the determined reliability as a reliability level; and
- an error correction unit for subjecting the demodulated signals to error correction based on the reliability level.

8. The receiver of claim 7 wherein
the interference average calculation unit sets the first threshold value at one or plural fixed values.

9. The receiver of claim 7 wherein
the interference average calculation unit performs said first comparison between the interference levels and the first threshold value, correcting the interference levels on the basis of the first comparison result, calculating an average of the interference levels including the corrected interference levels, and outputting the calculated average as the interference average level.

10. The receiver of claim 7 wherein
the interference average calculation unit performs said first comparison between the interference levels and the first threshold value, selects the at least two of the interference levels to be averaged, on the basis of the first comparison result, calculates the average of the selected interference levels, multiplies the calculated average of the selected interference levels by a predetermined coefficient to raise the average, and outputting the raised average as the interference average level.

11. The receiver of claim 7 wherein
the reliability determination unit sets the second threshold value at one or plural fixed values.

12. The receiver of claim 7 wherein
the reliability determination unit calculates a difference between the interference levels and the interference average level as differential levels, determines a carrier that has been subjected to frequency selective interference on the basis of the differential levels, performs said third comparison between the second threshold value and the differential level of the carrier that has been determined to be subjected to the frequency selective interference, determines the reliability of the plural carriers stepwise on the basis of the third comparison result, and outputs the determined reliability as the reliability level.

13. A receiver for receiving a frequency division multiplex (FDM) transmission signal which is produced by plural carrier signals generated at various frequencies within a transmission band being modulated with information signals which are assigned to the plural carrier signals, respectively, said receiver comprising:
   a demodulation unit for demodulating the information signals from the received FDM transmission signal;
   a reference value calculation unit for calculating an average power of the plural carrier signals that constitute the received FDM transmission signal, and outputting the calculated average power as a reference value;
   an interference detection unit for detecting the degree of influence by frequency selective interference for the plural carrier signals of the received FDM transmission signal, as interference levels, respectively;
   an interference average calculation unit for setting one or plural first threshold values based on the calculated reference value, performing a first comparison between the interference levels and the first threshold value, selecting at least two of the interference levels to be averaged, based on the first comparison result, and calculating an average of the selected interference levels to be outputted as an interference average level;
   a reliability determination unit for performing a second comparison between the interference levels and the interference average level, determining a carrier signal that has been subjected to frequency selective interference based on the second comparison result, setting one or plural second threshold values based on the reference value, performing a third comparison between an interference level of the carrier signal that has been subjected to the frequency selective interference and the second threshold value, determining reliability of the plural carrier signals based on the third comparison result, and outputting the determined reliability as a reliability level; and
   an error correction unit for subjecting the demodulated signals to error correction based on the reliability level.

14. The receiver of claim 13 wherein
   the interference average calculation unit sets the first threshold value at one or plural fixed values.

15. The receiver of claim 13 wherein
   the interference average calculation unit performs the first comparison between the interference levels and the first threshold value, corrects the interference levels on the basis of the first comparison result, calculates an average of the interference levels including the corrected interference levels, and outputs the calculated average as the interference average level.

16. The receiver of claim 13 wherein
   the interference average calculation unit performs the first comparison between the interference levels and the first threshold value, selects the interference levels to be averaged, on the basis of the first comparison result, calculates an average of the selected interference levels, multiplies the calculated average of the interference average levels by a predetermined coefficient to raise the average, and outputs the raised average as the interference average level.

17. The receiver of claim 13 wherein
   the reliability determination unit sets the second threshold value at one or plural fixed values.

18. The receiver of claim 13 wherein
   the reliability determination unit calculates a difference between the interference levels and the interference average level as differential levels, determines a carrier that has been subjected to frequency selective interference on the basis of the differential levels, performs said third comparison between the second threshold value and the differential level of the carrier that has been determined to be subjected to the frequency selective interference, determines the reliability of the plural carriers stepwise on the basis of the third comparison result, and outputs the determined reliability as the reliability level.

19. A receiver for receiving a frequency division multiplex (FDM) transmission signal which is produced by plural carrier signals generated at various frequencies within a transmission band being modulated with information signals which are assigned to the plural carrier signals, respectively, and pilot signals being inserted into the modulated carrier signals as references for detection of the carrier signals, said receiver comprising:
   a demodulation unit for demodulating the information signals from the received FDM transmission signal;
   a reference value calculation unit for calculating an average power of channel characteristics of the carrier signals based on the pilot signals that have been inserted into the received FDM transmission signal, and outputting the average power as a reference value;
   an interference detection unit for detecting the degree of influence by frequency selective interference for the plural carrier signals of the received FDM transmission signal, as interference levels, respectively;
   an interference average calculation unit for calculating an average of the interference levels, and outputting the calculated average as an interference average level;
   an interference determination unit for performing a first comparison between the interference average level calculated by the interference average calculation unit and an interference determination reference value to generate an interference determination level;
   a reliability determination unit for setting one or plural first threshold values based on the reference value, performing a second comparison between the first threshold value and the interference levels, determining reliability of the plural carrier signals based on the second comparison result, correcting the reliability of the plural carrier signals based on the interference determination level, and outputting the corrected reliability as a reliability level; and
   an error correction unit for subjecting the demodulated signals to error correction based on the reliability level.

20. A receiver for receiving a frequency division multiplex (FDM) transmission signal which is produced by plural carrier signals generated at various frequencies within a transmission band being modulated with information signals which are assigned to the plural carrier signals, respectively, said receiver comprising:
   a demodulation unit for demodulating the information signals from the received FDM transmission signal;
   a reference value calculation unit for calculating an average power of the plural carrier signals that constitute the received FDM transmission signal, and outputting the average power as a reference value;
   an interference detection unit for detecting the degree of influence by frequency selective interference for the plural carrier signals of the received FDM transmission signal, as interference levels, respectively;
   an interference average calculation unit for calculating an average of the interference levels, and outputting the calculated average as an interference average level;

an interference determination unit for performing a first comparison between the interference average level calculated by the interference average calculation unit and an interference determination reference value;

a reliability determination unit for setting one or plural first threshold values based on the reference value, performing a second comparison between the first threshold value and the interference levels, determining reliability of the plural carrier signals based on the second comparison result, correcting the reliability of the plural carrier signals based on an interference determination level, and outputting the corrected reliability as a reliability level; and an error correction unit for subjecting the demodulated signals to error correction based on the reliability level.

21. The receiver of claim 20 wherein
the interference determination unit sets the first threshold value at one or plural values on the basis of the reference value, performs a third comparison between the interference levels and the first threshold, determines the degree of influence by the interference over the transmission band on the basis of the third comparison result, and outputs the determined level as the interference determination level.

22. The receiver of claim 20 wherein
the interference determination unit sets the first threshold value at one or plural fixed values.

23. A receiver for receiving a frequency division multiplex (FDM) transmission signal which is produced by plural carrier signals generated at various frequencies within a transmission band being modulated with information signals which are assigned to the plural carrier signals, respectively, and pilot signals being inserted into the modulated carrier signals as references for detection of the carrier signals, said receiver comprising:
a demodulation unit for demodulating the information signals from the received FDM transmission signal;
a reference value calculation unit for calculating an average power of channel characteristics of the carrier signals based on the pilot signals that have been inserted into the received FDM transmission signal, and outputting the average power as a reference value;
an interference detection unit for detecting the degree of influence by frequency selective interference for the plural carrier signals of the received FDM transmission signal, as interference levels, respectively;
an interference average calculation unit for calculating an average of the interference levels, and outputting the calculated average as an interference average level;
an interference determination unit for performing a first comparison between the interference average level calculated by the interference average calculation unit and an interference determination reference value;
a reliability determination unit for setting one or plural first threshold values based on the reference value, performing a second comparison between the first threshold value and the interference levels, determining reliability of the plural carrier signals based on the second comparison result, correcting the reliability of the plural carrier signals based on the interference determination level, and outputting the corrected reliability as a reliability level; and
an error correction unit for subjecting the demodulated signals to error correction based on the reliability level,
wherein
the interference determination unit sets a second threshold value at one or plural values based on the reference value, performs a third comparison between the interference levels and the second threshold, determines the degree of influence by the interference over the transmission band based on the third comparison result, and outputs the determined level as the interference determination level.

24. A receiver for receiving a frequency division multiplex (FDM) transmission signal which is produced by plural carrier signals generated at various frequencies within a transmission band being modulated with information signals which are assigned to the plural carrier signals, respectively, and pilot signals being inserted into the modulated carrier signals as references for detection of the carrier signals, said receiver comprising:
a demodulation unit for demodulating the information signals from the received FDM transmission signal;
a reference value calculation unit for calculating an average power of channel characteristics of the carrier signals based on the pilot signals that have been inserted into the received FDM transmission signal, and outputting the average power as a reference value;
an interference detection unit for detecting the degree of influence by frequency selective interference for the plural carrier signals of the received FDM transmission signal, as interference levels, respectively;
an interference average calculation unit for calculating an average of the interference levels, and outputting the calculated average as an interference average level;
an interference determination unit for performing a first comparison between the interference average level calculated by the interference average calculation unit and an interference determination reference value;
a reliability determination unit for setting one or plural first threshold values based on the reference value, performing a second comparison between the first threshold value and the interference levels, determining reliability of the plural carrier signals based on the second comparison result, correcting the reliability of the plural carrier signals based on the interference determination level, and outputting the corrected reliability as a reliability level; and
an error correction unit for subjecting the demodulated signals to error correction based on the reliability level,
wherein
the interference determination unit sets the first threshold value at one or plural fixed values.

25. A method for receiving a frequency division multiplex (FDM) transmission signal which is produced by plural carrier signals generated at various frequencies within a transmission band being modulated with information signals which are assigned to the plural carrier signals, respectively, and pilot signals being inserted into the modulated carrier signals as references for detection of the carrier signals, said method comprising:
demodulating the information signals from the received FDM transmission signal;
calculating an average power of channel characteristics of the carrier signals based on the pilot signals that have been inserted into the received FDM transmission signal, and outputting the average power as a reference value;
detecting the degree of influence by frequency selective interference for the plural carrier signals of the received FDM transmission signal, as interference levels, respectively;
setting one or plural threshold values based on the reference value, performing a comparison between the threshold value and the interference levels, determining reliability of the plural carrier signals based on the comparison result, and outputting the determined reliability as a reliability level; and subjecting the demodulated signals to error correction based on the reliability level.

26. A method for receiving a frequency division multiplex (FDM) transmission signal which is produced by plural carrier signals generated at various frequencies within a transmission band being modulated with information signals which are assigned to the plural carrier signals, respectively, and pilot signals being inserted into the modulated carrier signals as references for detection of the carrier signals, said method comprising:

demodulating the information signals from the received FDM transmission signal;

calculating an average power of channel characteristics of the carrier signals based on the pilot signals that have been inserted into the received FDM transmission signal, and outputting the average power as a reference value;

detecting the degree of influence by frequency selective interference for the plural carrier signals of the received FDM transmission signal, as interference levels, respectively;

setting one or plural first threshold values based on the reference value, performing a first comparison between the interference levels and the first threshold value, selecting at least two of the interference levels to be averaged, based on the first comparison result, calculating an average of the selected interference levels, and outputting the calculated average as an interference average level;

performing a second comparison between the interference levels and the interference average level, determining a carrier signal that has been subjected to frequency selective interference based on the second comparison result, setting one or plural second threshold values based on the reference value, performing a third comparison between an interference level of the carrier signal that has been subjected to the frequency selective interference and the second threshold value, determining reliability of the plural carrier signals based on the third comparison result, and outputting the determined reliability as a reliability level; and subjecting the demodulated signals to error correction based on the reliability level.

27. A method for receiving a frequency division multiplex (FDM) transmission signal which is produced by plural carrier signals generated at various frequencies within a transmission band being modulated with information signals which are assigned to the plural carrier signals, respectively, and pilot signals being inserted into the modulated carrier signals as references for detection of the carrier signals, said method comprising:

demodulating the information signals from the received FDM transmission signal;

calculating an average power of channel characteristics of the carrier signals based on the pilot signals that have been inserted into the received FDM transmission signal, and outputting the average power as a reference value;

detecting the degree of influence by frequency selective interference for the plural carrier signals of the received FDM transmission signal, as interference levels, respectively;

calculating an average of the interference levels, and outputting the calculated average as an interference average level;

determining the degree of influence by the interference over the transmission band based on the interference average level, and outputting the determined degree of influence as an interference determination level;

setting one or plural first threshold values based on the reference value, performing a first comparison between the first threshold value and the interference levels, determining reliability of the plural carrier signals based on the first comparison result, correcting the reliability of the plural carrier signals based on the interference determination level, and outputting the corrected reliability as a reliability level; and subjecting the demodulated signals to error correction based on the reliability level.

* * * * *